United States Patent
O'Neill

(10) Patent No.: US 8,649,352 B2
(45) Date of Patent: *Feb. 11, 2014

(54) PACKET FORWARDING METHODS FOR USE IN HANDOFFS

(75) Inventor: Alan O'Neill, Henley Beach (AU)

(73) Assignee: Qualcomm Incorporated, San Diego, CA (US)

( * ) Notice: Subject to any disclaimer, the term of this patent is extended or adjusted under 35 U.S.C. 154(b) by 1419 days.

This patent is subject to a terminal disclaimer.

(21) Appl. No.: 10/431,108

(22) Filed: May 7, 2003

(65) Prior Publication Data
US 2003/0193912 A1    Oct. 16, 2003

Related U.S. Application Data

(63) Continuation-in-part of application No. 10/357,265, filed on Feb. 3, 2003, now Pat. No. 6,785,256, and a continuation-in-part of application No. 10/430,166, filed on May 6, 2003, now Pat. No. 7,564,824.

(60) Provisional application No. 60/378,404, filed on May 7, 2002, provisional application No. 60/354,195, filed on Feb. 4, 2002.

(51) Int. Cl.
*H04W 4/00* (2009.01)
*H04J 3/24* (2006.01)

(52) U.S. Cl.
USPC ........... 370/331; 370/349; 370/393; 370/474; 455/436

(58) Field of Classification Search
USPC .......... 370/328, 329, 331, 338, 351, 400, 475
See application file for complete search history.

(56) References Cited

U.S. PATENT DOCUMENTS

| | | | |
|---|---|---|---|
| 4,833,701 A | 5/1989 | Comroe et al. |
| 5,267,261 A | 11/1993 | Bkajebet, II et al. |
| 5,491,835 A | 2/1996 | Sasuta et al. |
| 5,572,528 A | 11/1996 | Shuen |
| 5,594,948 A | 1/1997 | Talarmo et al. |
| 5,901,362 A | 5/1999 | Cheung et al. |
| 6,006,090 A | 12/1999 | Coleman et al. |
| 6,097,966 A | 8/2000 | Hanley |

(Continued)

FOREIGN PATENT DOCUMENTS

| | | |
|---|---|---|
| WO | 95/12297 | 5/1995 |
| WO | PCT/US98/47302 | 10/1998 |

OTHER PUBLICATIONS

PCT International Search Report, for International Application No. PCT/US03/14193, Aug. 19, 2003.

(Continued)

*Primary Examiner* — Yemane Mesfin
*Assistant Examiner* — Christine Duong
(74) *Attorney, Agent, or Firm* — Kam T. Tam

(57) ABSTRACT

Extending Mobile IP (MIP) to support both local and remote access by using two MIP client stacks in the end node, a roaming Node in the local access network, a standard Home Agent in the remote network is described. Messages between the access node and the mobile node, and between the internal modules of the mobile node are used to control hand-off for each of multiple MIP clients operating in parallel in the mobile node and to enable backwards compatibility with legacy remote access clients.

28 Claims, 10 Drawing Sheets

(56) References Cited

U.S. PATENT DOCUMENTS

| | | | |
|---|---|---|---|
| 6,137,791 A | 10/2000 | Frid et al. | |
| 6,144,671 A | 11/2000 | Perinpanathan et al. | |
| 6,161,008 A | 12/2000 | Lee et al. | |
| 6,195,705 B1 | 2/2001 | Leung | |
| 6,256,300 B1 | 7/2001 | Ahmed et al. | |
| 6,298,234 B1 | 10/2001 | Brunner | |
| 6,308,267 B1 | 10/2001 | Gremmelmaier | |
| 6,366,561 B1 | 4/2002 | Bender | |
| 6,400,722 B1 | 6/2002 | Chuah et al. | |
| 6,434,134 B1 | 8/2002 | La Porta et al. | |
| 6,445,922 B1 | 9/2002 | Hiller et al. | |
| 6,446,127 B1 | 9/2002 | Schuster et al. | |
| 6,449,234 B1 | 9/2002 | Ahn et al. | |
| 6,466,964 B1 | 10/2002 | Leung et al. | |
| 6,496,505 B2 * | 12/2002 | La Porta et al. | 370/392 |
| 6,510,153 B1 * | 1/2003 | Inoue et al. | 370/354 |
| 6,516,194 B2 | 2/2003 | Hanson | |
| 6,539,225 B1 | 3/2003 | Lee | |
| 6,563,919 B1 | 5/2003 | Aravamudhan et al. | |
| 6,578,085 B1 | 6/2003 | Khalil et al. | |
| 6,591,105 B1 | 7/2003 | Hussain et al. | |
| 6,603,969 B1 | 8/2003 | Vuoristo et al. | |
| 6,611,547 B1 | 8/2003 | Rauhala | |
| 6,621,810 B1 | 9/2003 | Leung | |
| 6,657,992 B1 | 12/2003 | Christie, IV | |
| 6,754,482 B1 | 6/2004 | Torabi | |
| 6,763,007 B1 | 7/2004 | La Porta et al. | |
| 6,842,456 B1 | 1/2005 | Chen et al. | |
| 6,862,446 B2 | 3/2005 | O'Neill et al. | |
| 6,982,967 B1 | 1/2006 | Leung | |
| 6,987,771 B2 | 1/2006 | Shimizu et al. | |
| 6,992,994 B2 * | 1/2006 | Das et al. | 370/328 |
| 6,992,995 B2 * | 1/2006 | Agrawal et al. | 370/328 |
| 6,999,437 B2 | 2/2006 | Krishnamurthi et al. | |
| 6,999,763 B2 | 2/2006 | Ramalho et al. | |
| 7,020,465 B2 | 3/2006 | O'neill | |
| 7,042,879 B2 * | 5/2006 | Eschbach et al. | 370/392 |
| 7,082,114 B1 | 7/2006 | Engwer et al. | |
| 7,136,362 B2 | 11/2006 | Chen | |
| 7,136,365 B2 | 11/2006 | Nakatsugawa et al. | |
| 7,136,389 B2 | 11/2006 | Shahrier et al. | |
| 7,190,668 B1 * | 3/2007 | Francis et al. | 370/229 |
| 7,193,977 B2 * | 3/2007 | Lim | 370/313 |
| 7,227,863 B1 | 6/2007 | Leung et al. | |
| 7,277,948 B2 | 10/2007 | Igarashi et al. | |
| 7,366,145 B2 | 4/2008 | Flinck | |
| 7,509,123 B2 | 3/2009 | O'neill | |
| 7,525,937 B2 | 4/2009 | O'neill | |
| 7,564,824 B2 | 7/2009 | O'neill | |
| 8,095,130 B2 | 1/2012 | O'Neill | |
| 8,179,840 B2 | 5/2012 | O'neill | |
| 2001/0016492 A1 | 8/2001 | Igarashi et al. | |
| 2001/0036164 A1 | 11/2001 | Kakemizu et al. | |
| 2001/0041571 A1 | 11/2001 | Yuan et al. | |
| 2001/0046223 A1 * | 11/2001 | Malki et al. | 370/338 |
| 2002/0009073 A1 * | 1/2002 | Furukawa et al. | 370/352 |
| 2002/0015396 A1 * | 2/2002 | Jung | 370/338 |
| 2002/0018456 A1 | 2/2002 | Kakemizu et al. | |
| 2002/0026527 A1 | 2/2002 | Das et al. | |
| 2002/0055971 A1 | 5/2002 | Shahrier | |
| 2002/0057657 A1 * | 5/2002 | La Porta et al. | 370/331 |
| 2002/0068565 A1 | 6/2002 | Pumadi et al. | |
| 2002/0080752 A1 * | 6/2002 | Johansson et al. | 370/338 |
| 2002/0136226 A1 | 9/2002 | Christoffel et al. | |
| 2002/0147820 A1 | 10/2002 | Yokote | |
| 2002/0191593 A1 | 12/2002 | O'Neill et al. | |
| 2002/0199104 A1 | 12/2002 | Kakemizu et al. | |
| 2003/0012179 A1 | 1/2003 | Yano et al. | |
| 2003/0018810 A1 * | 1/2003 | Karagiannis et al. | 709/238 |
| 2003/0036374 A1 | 2/2003 | English et al. | |
| 2003/0060199 A1 | 3/2003 | Khalil et al. | |
| 2003/0079144 A1 | 4/2003 | Kakemizu et al. | |
| 2003/0092441 A1 | 5/2003 | Taha et al. | |
| 2003/0123421 A1 * | 7/2003 | Feige et al. | 370/338 |
| 2003/0137961 A1 | 7/2003 | Tsirtsis et al. | |
| 2003/0137991 A1 | 7/2003 | Doshi et al. | |
| 2003/0157938 A1 | 8/2003 | Haase et al. | |
| 2003/0176188 A1 | 9/2003 | O'Neill | |
| 2003/0193952 A1 | 10/2003 | O'neill | |
| 2003/0212800 A1 | 11/2003 | Jones et al. | |
| 2003/0214922 A1 | 11/2003 | Shahrier | |
| 2003/0228868 A1 | 12/2003 | Turanyi et al. | |
| 2004/0018841 A1 | 1/2004 | Trossen | |
| 2004/0024901 A1 | 2/2004 | Agrawal et al. | |
| 2004/0148428 A1 | 7/2004 | Tsirtsis | |
| 2004/0196808 A1 | 10/2004 | Chaskar et al. | |
| 2004/0213181 A1 | 10/2004 | Grech et al. | |

OTHER PUBLICATIONS

C. Perkins, Editor "IP Mobility Support", Network Working Group, pp. 1-79 (Oct. 1996).
Li, Yalun "Protocol Architecture for Universal Personal Computing" IEEE Journal on Selected Areas in Communications 15(8): 1467-1476 (1997).
IETF, Network Working Group, Request for Comments: 2205, Resource Reservation Protcol (RSVP)—Version 1 Functional Specification, pp. 1-105 (Sep. 1997).
IETF, Network Working Group, Request for Comments: 2206, RSVP Management Informatin Base Using SMIv2, pp. 1-60 (Sep. 1997).
IETF, Network Working Group, Request for Comments: 2207, RSVP Extension for IPSEC Data Flows, pp. 1-14 (Sep. 1997).
IETF, Network Working Group, Request for Comments: 2210, The Use of RSVP with IETF Integrated Services, pp. 1-31 (Sep. 1997).
IETF, Network Working Group, Request for Comments: 2208, Resource Reservation Protocol (RSVP) Version 1 Applicability Statement Some Guidelines on Deployment, pp. 1-6 (Sep. 1997).
IETF, Network Working Group, Request for Comments: 2209, Resource Reservation Protocol (RSVP)—Version 1 Message Processing Rules, pp. 1-24 (Sep. 1997).
J. Moy, Editor, "OSPF Version 2", Network Working Group, pp. 1-244 (Apr. 1998).
Valko, Andras "Cellular IP: A New Approach to Internet Host Mobility" Computer Communications Review 29(1): 50-65 (1999).
Andras G. Valko, "Cellular IP—A New Approach to Internet Host Mobility," ACM Computer Communication Review, vol. 29, No. 1, pp. 50-65, Jan. 1999.
TIA/EIA/IS-707A.8 "Data Service Options for Spread Spectrum Systems: Radio Link Protocol Type 2" pp. 1-1:4:12 (Mar. 1999).
Karagiannis, Mobile IP, State of the Art Report, pp. 1-63, Jul. 1999.
Elin Wedlund et al., "Mobility Support Using SIP", Proc. Of ACM/IEEE International Conference on Wireless and Mobile Multimedia (WoWMoM '99), Seattle, Washington, Aug. 1999.
Henning Schulzrinne et al., "Application-Layer Mobility Using SIP", 0-7803-7133 IEEE, pp. 29-36, Jan. 2000.
"Source Specific Multicast (SSM) Explicit Multicast (Xcast)" pp. 1-27 (Copyright 2001 by ETRI).
IETF Network Working Group, Request for Comments: 2961, RSVP Refresh Overhead Reduction Extensions, pp. 1-32 (Apr. 2001).
Marshall, W., et al., Integration of Resource Management and SIP, IETF Internet Draft, draft-ietf-sip-manyfolks-resource-02.txt, Aug. 2001, pp. 1-28.
Andrew T. Campbell et al., "IP Micro-Mobility Protocols", ACM Sigmobile Mobile Computer and Communication Review (MC2R), vol. 4, No. 4, pp. 34-54, Oct. 2001.
S. Zhou et al., "A Location Management Scheme for Support Mobility In Wireless IP Networks Using Session Initiation Protocol (SIP)", 1531-2216/01 IEEE, Oct. 2001, pp. 486-491.
Bos, L., et al., A Framework for End-to-End Perceived Quality of Service Negotiation, IETF Internet Draft, draft-bos-mmusic-sdpqos-framework-00.txt, Nov. 2001, pp. 1-22.
Papalilo, D., et al., Extending SIP for QoS Support www.coritel.it/publications/IP_download/papalilo-salsano-veltri.pdf, Dec. 8, 2001, pp. 1-6.
Camarillo, P., et al., Integration of Resource Management and SIP, IETF Internet Draft, draft-ietf-sip-manyfolks-resource-04.ps, Feb. 25, 2002 pp. 1-18.
Ho, Integration AAA with Mobile IPv4, Internet Draft, pp. 1-59, Apr. 2002.

(56) References Cited

OTHER PUBLICATIONS

"SIP: Session Initiation Protocol", IEFT Network Wording Group, Request for Comments: 3261, (Jun. 2002), pp. 1-29.

IETF, Network Working Group, Request for Comments: 3261 "SIP: Session Initiation Protocol", pp. 1-269 (printed as pp. 1-252) (Jun. 2002).

Network Working Group, IPv6 Prefix Delegation Using ICMPv6, pp. 1-33, Apr. 2004.

IETF Mobile IP Working Group, "Mobility Support in IPv6", D. Johnson, Rice University, C. Perkins, Nokia Research Center, J. Arkko, Ericsson; Feb. 26, 2003, downloaded from http://www.join.uni-muenster.de on Dec. 29, 2004, pp. 1-158.

Network Working Group, "IP Mobility Support for IPv4", C. Perkins, Ed., Nokia Research Center, Jan. 2002, downloaded from http://www.ietf.org on Dec. 29, 2004, pp. 1-92.

International Search Report from International Application No. PCT/US2003/014193; pp. 1-3, Dated Aug. 19, 2003.

International Search Report-PCT/US03/014338, International Search Authority US, May 7, 2003.

International Search Report-PCT/US03/014199, International Search Authority European Patent Office, Sep. 24, 2003.

\* cited by examiner

| Field Content | Message 180a | Message 180b | Message 180c | Message 180d | Message 180e | Message 180f |
|---|---|---|---|---|---|---|
| 1013→ LA | Type | Type | Type | Type | Type | Type |
| 1014→ HA | | | | | | |
| 1015→ HoA | | | | | | |
| 1016→ nAN | DA | SA | | SA | SA | |
| 1017→ oAN | PFANE | | | DA/HA | | |
| 1018→ oCoA | PFANE | | | HoA | | |
| 1019→ nRN | HA=0 | DA | | | | SA |
| 1020→ oRN | PRANE | PRANE | | | DA/HA | DA/HA |
| 1021→ oRoA | PRANE | PRANE | | | HoA | HoA |
| 1022→ nCoA | CoA | CoA | | CoA | CoA | |
| 1023→ nRoA | HoA=0 | HoA=0 | | | | CoA |
| 1024→ PFAA | PFANE | | | MN–oAN | | |
| 1025→ PRAA | PRANE | PRANE | | | MN–oRN | MN–oRN |

FIG. 10

| Field Content | Message 180a | Message 180b | Message 180c | Message 180d | Message 180e | Message 180f |
|---|---|---|---|---|---|---|
| 1113→ LA | Type | Type | Type | Type | Type | Type |
| 1114→ HA | | | | | | |
| 1115→ HoA | | | | | | |
| 1116→ nAN | DA | SA | | SA | SA | |
| 1117→ oAN | PFANE | | | DA/HA | | |
| 1118→ oCoA | PFANE | | | HoA | | |
| 1119→ nRN | | DA | | | | SA |
| 1120→ oRN | HA | HA | | | DA/HA | DA/HA |
| 1121→ oRoA | SA/HoA | HoA | | | HoA | HoA |
| 1122→ nCoA | HFAext | HFAext | | CoA | CoA | |
| 1123→ nRoA | CoA=0 | CoA=0 | | | | CoA |
| 1124→ PFAA | PFANE | | | MN–oAN | | |
| 1125→ PRAA | MN–oRN | MN–oRN | | | MN–oRN | MN–oRN |

FIG. 11

| Field Content | Message 180a | Message 180b | Message 180c | Message 180d | Message 180e | Message 180f |
|---|---|---|---|---|---|---|
| 1213→RA/LARA | Type | Type | Type | Type | Type | Type |
| 1214→HA | | | | | | |
| 1215→HoA | | | | | | |
| 1216→nAN | DA | SA | | SA | SA | |
| 1217→oAN | PFANE | | | DA/HA | | |
| 1218→oCoA | PFANE | | | HoA | | |
| 1219→nRN | HFAIP (0) | DA | | | | SA |
| 1220→oRN | HA | HA | | | DA/HA | DA/HA |
| 1221→oRoA | SA/HoA | HoA | | | HoA | HoA |
| 1222→nCoA | HFAext | HFAext | | CoA | CoA | |
| 1223→nRoA | CoA (0) | CoA (0) | | | | CoA |
| 1224→PFAA | PFANE | | | MN–oAN | | |
| 1225→PRAA | MN–oRN | MN–oRN | | | MN–oRN | MN–oRN |

FIG. 12

| Field Content | Message 180a | Message 180b | Message 180c | Message 180d | Message 180e | Message 180f |
|---|---|---|---|---|---|---|
| 1313→RA/LARA | Type | Type | Type | Type | Type | Type |
| 1314→HA | HA | HA | DA/HA | | | |
| 1315→HoA | SA/HoA | HoA | HoA | | | |
| 1316→nAN | DA | SA | | SA | SA | |
| 1317→oAN | PFANE | | | DA/HA | | |
| 1318→oCoA | PFANE | | | HoA | | |
| 1319→nRN | HFAIP (0) | DA | SA | | | SA |
| 1320→oRN | PRANE | PRANE | | | DA/HA | DA/HA |
| 1321→oRoA | PRANE | PRANE | | | HoA | HoA |
| 1322→nCoA | HFAext | HFAext | | CoA | CoA | |
| 1323→nRoA | CoA (0) | CoA (0) | HFAext | | | CoA |
| 1324→PFAA | PFANE | | | MN–oAN | | |
| 1325→PRAA | PRANE | PRANE | | | MN–oRN | MN–oRN |

FIG. 13

PACKET FORWARDING METHODS FOR USE IN HANDOFFS

RELATED APPLICATIONS

The present application claims the benefit of U.S. Provisional Patent Application Ser. No. 60/378,404 filed May 7, 2002 entitled: "COMMUNICATIONS METHODS AND APPARATUS" and is a continuation-in-part of U.S. patent application Ser. No. 10/357,265 filed Feb. 3, 2003 now U.S. Pat. No. 6,785,256 entitled: "A METHOD FOR EXTENDING MOBILE IP AND AAA TO ENABLE INTEGRATED SUPPORT FOR LOCAL ACCESS AND ROAMING ACCESS CONNECTIVITY", now U.S. Pat. No. 6,785,256, which claims the benefit of U.S. Provisional Patent Application Ser. No. 60/354,195 filed Feb. 4, 2002 entitled: "A METHOD FOR EXTENDING MOBILE IP TO ENABLE INTEGRATED SUPPORT FOR LOCAL ACCESS AND ROAMING ACCESS CONNECTIVITY"; and is also a continuation in part of U.S. Pat. application Ser. No. 10/430,166 entitled "METHODS AND APPARATUS FOR AGGREGATING MIP AND AAA MESSAGES" which was filed on May 6, 2003, now U.S. Pat. No. 7,564,824, each of the preceding applications are hereby expressly incorporated by reference into the present application.

FIELD OF THE INVENTION

The present invention is directed to establishing and managing a data communication session and, more particularly, to establishing a data communication session through an access node (AN) in a multi-node network, e.g., a cellular network in which mobile end nodes communicate with each other and other end systems through ANs. ANs are commercially sometimes also known as RadioRouters (RR).

BACKGROUND

Internet Protocol (IP) technology is designed to enable packet-switched interconnection of a heterogeneous set of devices (e.g., computers) and communication networks. A potentially diverse set of network and link layer technologies are interconnected through nodes, e.g., gateways (or routers), that provide a packet forwarding service. Information is transferred between "end nodes" (or hosts) as blocks of data called datagrams, where source and destination hosts are identified by fixed length addresses. Routing in IP internetworks is connectionless in nature, in that datagrams are forwarded by routers on a hop-by-hop basis using the destination address in the datagram.

Mobile IP (MIP) (Ref: IETF RFC 2002, incorporated herein by reference) enables an IP host, also called a "Mobile Node" (MN) in the context of Mobile IP, to dynamically change its point of attachment to the network, yet remain contactable via a previously given "home address". To achieve this, a temporary local address or "care of address" is associated with the MN when it visits a foreign network, the visited network. In some cases the care of address is that of a "foreign agent" that assists in this process, while in other cases the care of address may be directly assigned to the MN. The care of address is registered back on the home network in a node referred to as the "home agent". The home agent intercepts packets destined to the home address of the MN and redirects the packets, by means of encapsulation and tunneling, towards the care of address associated with MN in the visited network. Upon delivery to the care of address, the encapsulation is removed and the original packet destined to the home address is delivered to the MN.

Accordingly, MIP enables a moving Internet host to connect to a Foreign Agent (FA) at an AN in a visited network, yet still be contactable on its persistent Home Address (HoA) that it uses on its home network and is likely contained in a Domain Name Server (DNS) system. This is possible because the FA gives the host a temporary local address that is either unique to the host (Co-located Care of Address or CCoA) or is unique to the FA (Shared Care of Address or SHCoA). In various applications, the FA registers its CoA into the HA for the HoA address of its attached MN. The HA then tunnels packets addressed to the HoA of MN to the Care of Address (CoA) of the FA. The FA forwards packets received from the MN HoA out to the Internet as normal, or reverse tunnels the packets to the Home Agent.

A MIP Local Access (LA) service can be supported in a home domain between the MN and a local home agent (HA) in the local access network, wherein the MN uses a Home Address (HoA) from the local HA as an application address. The MIP client registers the FA CoA received from the AN (e.g. AR) as a care of address for the HoA into the HA. When the MN changes ARs, then the MN can issue another MIP message to the local HA to update the FA CoA of the MN.

A MIP Remote Access (RA) service can also be supported in a visited domain between the MN and a remote home agent in the home domain of the MN, wherein the MN uses a HoA address from a remote Home Agent (HA) as an application address and an IP address from the AN subnet as an interface address. The MIP client then registers the interface address from the AN as a Co-located Care of Address (CCoA) into the Remote HA for the remote HoA. A remote access hand-off is then required when the MN changes AN because the interface address which is also the CCoA of the MN changes and hence needs to be updated in the remote HA.

A limitation of the above existing Mobile IP signaling and forwarding model is that it only supports one access type at the time, either remote or local access with a single HA.

In addition, well-known deployed operating systems already have MIP clients deployed that perform remote access using the interface address of the MN, and such clients cannot be assumed to be capable of being modified when a MN also seeks to support local access in a wireless network that by implication must have a MIP client capable of supporting fast hand-offs between ANs.

Current versions of Mobile IP do not support sufficient MIP signaling between the MN and the AN to coordinate both remote and local access hand-offs in an efficient manner. In addition, current versions of MIP do not define MN internal signaling that would enables an MN to manage address changes for local and remote access interfaces in an efficient manner, e.g., in parallel.

In view of the above discussion, it is apparent that there is a need for supporting enhanced end node mobility, communication session establishment and several other operations related to establishing and maintaining communications sessions in systems which use packets to transmit data.

SUMMARY OF THE INVENTION

Methods, apparatus, and data structures for providing an end node, e.g., a MN, with multiple concurrent services when connected to an Access Node, e.g. a local Access Router (AR), in an access network are described. The services include a local access service and a remote access service employing an enhanced mobility agent module (e.g.: MIP client stack). Various methods, apparatus and data structures of the present invention involve messages and techniques associated with the communication of hand-off information from MN to other MIP elements using MIP signaling, to manipulate binding entries in those elements and to configure redirection and processing state, to effect the redirection of packets for both local and remote access flows for the MN.

According to this present invention, a MN may employ both local and remote access at the same time by employing two Home Agents, one local and one remote. The local home agent is referred to herein as a regional or Roaming Node (RN) since it is in the same region as the mobile node, e.g., a region visited by said mobile node.

In accordance the present invention information, the AN, e.g. AR, communicates to the end node (i) the IP address of the AR, (ii) the IP address of its assigned Regional Roaming Node (RN) and (iii) the Regional Roaming Address (RoA) of the end node assigned by said RN. This information is received by the MIP client in the end node and used to trigger a range of MIP hand-off messages. The received information is compared to previously received information to detect changes in these addresses. A change in AR results in a local access MIP message from the MIP client to the RN to update it with the new CoA of the MN at that AR. A change in RN address results in a Local Access (LA) MIP message to the new RN to obtain a new RoA and to install the CoA into that RN. A change in RoA results in a Remote Access (RA) MIP message being sent to the remote home agent to register the new RoA as the CCoA of the remote home address of the MN.

A network implemented in accordance with the present invention may include one or more ANs of the present invention through which end nodes can establish connectivity with a RN and a remote HA, and then conduct communications sessions. End nodes may be, for example, mobile devices which include or are IP hosts.

For purposes of explanation, the end node will sometimes be called an MN. However, it is to be understood that the end node could instead be a fixed node.

The modules included in the HAs, RNs, ANs and ENs, may be implemented using software, hardware, or a combination of software and hardware. In the case of software implementations, the modules include different instructions or sets of instructions used to control hardware, e.g., circuitry, to perform each of the different operations performed by the module.

Numerous additional embodiments, features, and advantages of the methods, apparatus and data structures of the present invention are discussed in the detailed description that follows.

BRIEF DESCRIPTION OF THE FIGURES

FIG. 7 may be used to explain various hand-off signals, packet flows, operations, and context transfer in accordance with the present invention.

FIG. 10 illustrates Message fields for Local Access to MIP to nRN for nRoA in accordance with the present invention.

FIG. 11 illustrates Message fields for Local Access MIP to oRN via RN in accordance with the present invention.

FIG. 12 illustrates Message fields for Remote Access or Combined Local and Remote Access MIP to oRN for oRoA in accordance with the present invention.

FIG. 13 illustrates Message fields for Remote Access or Combined Local and Remote Access MIP to HA for HoA in accordance with the present invention.

DETAILED DESCRIPTION

Figure 1:
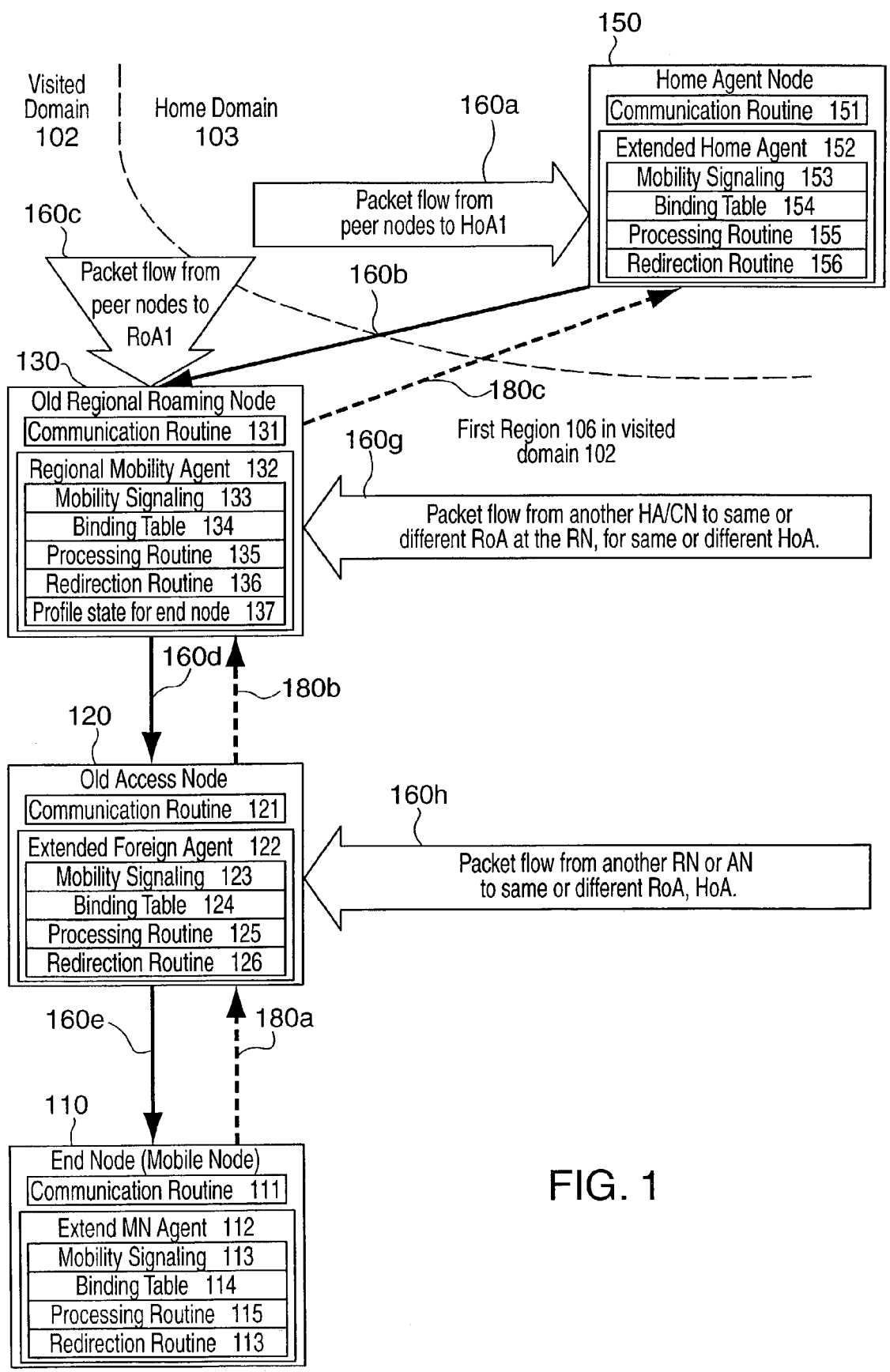
FIG. 1 illustrates an exemplary communications system including two network domains, an End Node (EN), an Access node (AN or oAN), a Regional Roaming node (RN or oRN), a Home Agent node (HA), exemplary packet flow, and exemplary signaling in accordance with the present invention.

The present application is directed to mobility management in a communications system, in which handoff operations occur, e.g., when a wireless terminal such as a mobile node changes its point of network attachment from one access node to another access node. In various embodiments of the invention, a mobile node involved in a handoff implements multiple IP clients resulting in multiple forwarding addresses being used. Each IP client may correspond to a different type of network access, e.g., with one IP client being used to obtain local network access in the region in which a mobile is located at any point in time and another IP client being used to obtain remote network access, e.g., access from the mobile node's home domain or region which the mobile node is visiting a foreign network domain or region. A single integrated IP client can alternatively be used to manage both local and remote addresses. In the present application the term old and new are generally used in the context of a handoff operation. In the case of a handoff the term "old" is normally used to refer to an existing connection, or relationship while the term "new" is to refer to a connection or relationship which is being established. In the context of node descriptions, new is generally used to refer to a node which will replace a like named node in terms of functionality as a result of a hand off. For example new Access Node refers to the node to which a mobile is being handed off to while old access node refers to the Access Node from which the mobile node is being handed off from.

Each node illustrated in the present figures includes memory for storing messages which are received or generated by the node. In some implementations the memory is part of an interface buffer located in an I/O interface corresponding to the message point of ingress to a node or egress from a node. In other embodiments, the memory is part of a general memory in the node used to store, e.g., one or more binding tables. Accordingly, among other things, the present invention is directed to novel messages stored in a memory device, e.g., node I/O buffer, wherein the messages are any one of the messages illustrated in the figures of the present application and wherein the memory device used to store the illustrated messages is memory included in the illustrated nodes.

In describing the invention, various acronyms are used. While many of the acronyms are well known MIP terms, for purposes of clarity a list of acronym's and there meaning follows.

| ACRONYM | MEANING |
| --- | --- |
| MIP | Mobile IP (protocol, message or node) |
| LA | Local access (message or service configured by message) |
| RA | Remote access (message or service configured by message) |
| LARA | Combined local and remote access (message or services configured by message) |
| EN | End Node |
| MN | Mobile Node |
| CN | Correspondent Node |
| o | old (used as prefix to other term) |
| n | new(used as prefix to other term) |
| AN | Access Node |
| oAN | Old Access Node |
| nAN | New Access Node |
| RN | Roaming Node also sometimes called Regional Node |
| oRN | Old Roaming/Regional Node |
| oRoA | Regional Address from the prefix assigned to the oRN |
| nRN | New Roaming/Regional Node |
| nRoA | Regional Address from the prefix assigned to the nRN |
| RMA | Regional Mobility agent module in RN or HA node. |
| HA | Home Agent (node and/or module) |
| HoA | Home Address from the prefix assigned to the HA |
| FA | Foreign Agent module (normally in AN or HA node) |
| CoA | Care of Address from the prefix assigned to an AN. |
| CCoA | Colocated CoA |
| SHCoA | CoA at a Foreign Agent (commonly known as FA CoA) |
| MSCoA | Mobile Specific CoA at a Foreign Agent (also sometimes known as Proxy CCoA (PCCoA)) |
| PRAA | Previous Regional Agent Authenticator |
| PRANE | Previous Regional Agent Notification Extension |
| PFAA | Previous Foreign Agent Authenticator |
| PFANE | Previous Foreign Agent Notification Extension |
| BU | Binding Update |
| Buack | Binding Update acknowledgement |
| RREQ | Registration Request |
| PREP | Registration Reply |
| GFA | Gateway Foreign Agent |
| HFAP | IP address of a hierarchical agent such as an RMA. |
| HFAext | CoA at a hierarchical foreign agent such as an RMA. |
| Stylext | Extension describing the redirection Style |
| AAA | Authentication, Authorization & Accounting |
| NAT | Network Address Translation |
| SA | Source address |
| DA | Destination address |

FIG. 1 shows a Home Agent node (HA) 150 in a home domain 103 and a regional roaming node (RN) 130, an access node (AN) 120 and an end node (EN) 110, e.g., Mobile Node (MN) in a first region 106 of a visited domain 102. The end node 110 has a regional address (RoA) assigned from a prefix at the regional node 130 and a home address (HoA) assigned from a prefix at the HA 150, plus a Care of Address (CoA) from the prefix at the AN 120. The various nodes 150, 130, 120, and 110 also include communications routines 151, 131, 121, and 111, respectively, used to forward data packets. The communication routines 111, 121, 131, and 151 also include methods to acquire, store and utilize policy state from a AAA server, associated with any of the nodes 110, 120, 130, 150, for a specific MN 110 or across all MNs in the system. The HA 150 also includes an extended home agent module 152 which supports at least Mobile IP standard home agent functionality. The RN 130 includes a regional mobility agent (RMA) module 132 which also supports at least extended home agent functionality of module 152, but also includes other regional functions to be described below. The AN 120 includes an extended foreign agent module 122 which supports at least standard Mobile IP foreign agent and/or Attendant functionality. The EN 110 includes an extended Mobile node agent module 112 which supports at least standard Mobile IP Mobile Node functions.

The HA 150, RN 130, EN 110 and optionally the AN 120 include a binding table 154, 134, 114 and 124, respectively, with entries that process and redirect the destination addresses of incoming packets flows into outgoing packet flows. The HA 150, RN 130, EN 110, and AN 120 include redirection routines 156, 136, 116 and 126, respectively, which control the redirection process, and processing routines 155, 135, 115 and 125, respectively which controls HoA specific processing as part of the redirection process. The nodes 150, 130, 110, and 120 also include mobility signaling 153, 133, 113 and 123, respectively, to send and receive MIP messages such as MIP Registration Requests (RREQ), Registration Replies (RREP), Binding Updates (EU) and Binding Update Acknowledgements (BUack) to control mobility management of the end node 110 for the RoA and the HoA addresses. Messages 180a, 180a, 180c are sent between nodes 110, 120, 130, 150 as mobility messages. Message 180a becomes message 180b either as a result of IP forwarding, in which case message 180a contents are the same as that of message 180b, or as a result of mobility message processing at the oAN 120, in which case the contents of messages 180a and 180b are different. Similarly, for messages passing through other nodes 120, 130. Specifically message 180a, from EN 110 to AN 120 and message 180b, from AN 120 to RN 130, can be used to update the CoA for the RoA in the binding table 134 of the RN 130 and the binding table 124 of the AN 120, and also to acquire the new RoA at each new RN (in each new region). Messages 180a and 180b thus enable packet flow 160d, from RN 130 to AN 120, and packet flow 160e , from AN 120 to EN 110, that forward local access packets (from peer nodes), with a destination address equal to the RoA as in flow 160c (from peer nodes to RN 130), to the end node 110. Messages 180a plus 180b plus 180c (from RN 130 to HA 1500) can then be used to update the binding table in at least the HA 150 to install the RoA as the CoA for the HoA in the HA binding table 154. This enables the HA 150 to forward packets with a destination address equal to the HoA of the MN 110, as in packet flow 160a (packet flow from peer nodes to HoA1), into packet flow 160b (packet flow from HA 150 to RN 130) which has a destination address also equal to the RoA. Packet flow 160b then joins flow 160c in being redirected into the flow 160d (from RN 130 to AN 120) by the RN binding table 134. The format of various packet flows 160 are controlled by the redirection routines 156, 136, 116, 126 and processing routines 155, 135, 115, 125, and the contents and forwarding of the various handoff messages controlled by the mobility signaling routines 153, 133, 113, 123, included in the nodes' mobility agents 152, 132, 112, 122, respectively. The Regional Nobilty agent 132 may include profile state for end nodes 137. Profile state for end nodes 137 may include identification of specific addresses that the MN 110 is or is not allowed to register with, as for example an INCLUDE/EXCLUDE list. Profile state for end nodes 137 may be transferred between Regional Roaming Nodes 130 for example, during hand-offs. FIG. 1 includes packet flow 160g to RN 130 and packet flow 160h to AN 120. Packet flow 160g includes packet flows from another HA/correspondence Node (CN) to the same or different RoA at the RN, for the same or different HoA. Packet flow 160h includes packet flows from another or different RN or AN to the same or a different RoA and HoA.

Note that the forwarding in the various binding tables 154, 134, 114, 124 should be able to prevent flow 160g, from a HA not known to the EN 110, using a HoA that may or not be the same as the HoA registered at HA 150. It should also be able to block packet flow 160h that is from an RN unknown to the EN 110 that is sending packets to an RoA that is the same or different to that of the EN 110. In effect, only registered packet flows from identified RNs and HAs, for identified RoAs and HoAs should be supported in the system.

Figure 2:
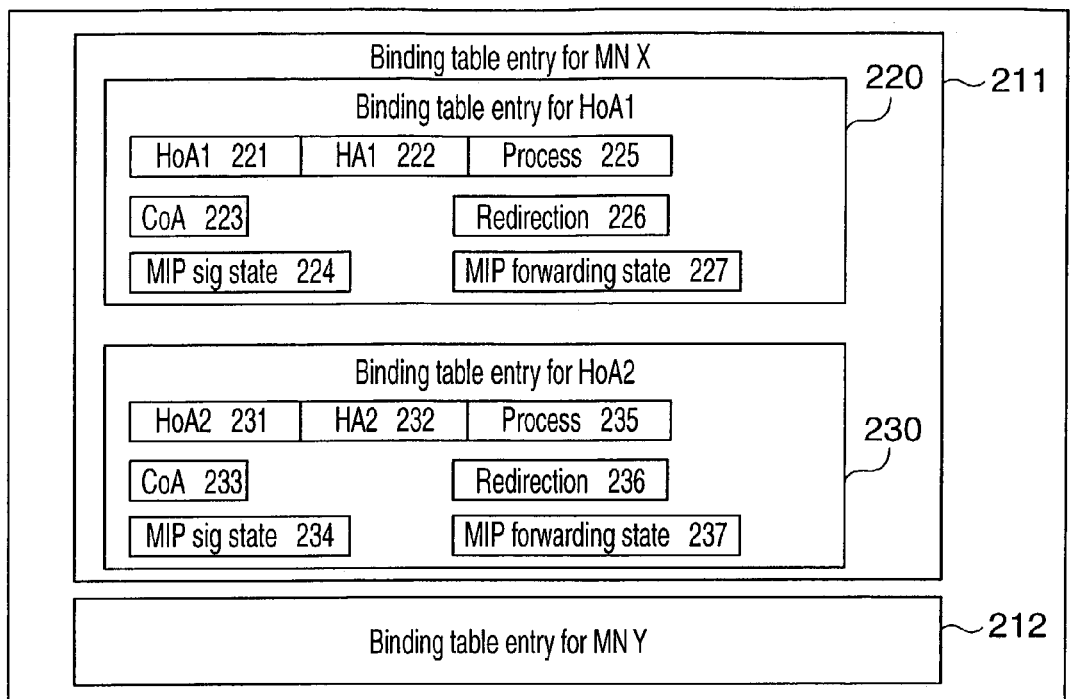
FIG. 2 illustrates a prior art binding table that is used in a standard MIP Home Agent of Foreign Agent.

FIG. 2 shows a prior art binding table 210 that is used in a standard MIP Home Agent or Foreign Agent. The table 210 has entries for a multitude of end nodes such as a binding table entry for Mobile Node X 211 and a binding table entry for Mobile Node Y 212. In the case of MN X, which has two home addresses, a Home Address 1 (HoA1) 221 and a Home Address 2 (HoA2) 231, the prior art signaling creates a binding table entry for HoA1 220 and a binding table entry for HoA2 230. Entry 220 contains HoA1 221, Home Agent Address 1 (HA1) 222, MN X Care of Address (CoA) 223, MIP signaling state 224 associated with that signaling instance. Entry 220 also contains a process field 225, a redirection field 226, and MIP forwarding state 227. Process field 225 indicates the installed HoA specific processes to perform as requested by a process indicator in a signaling message, or as indicated by a MN profile. The redirection field 226 in binding table entry 220 indicates whether the Home Agent is using a Colocated CoA (CCoA) that is associated with a specific MN or a Shared CoA (SHCoA) associated with a number of MNs, at a particular AN to reach the MN. Redirection field 226 also indicates whether an encapsulation or a routing header (for example) is being employed to effect that redirection. MIP forwarding state 227 is the combination of processes and associated state required for the forwarding action, given the status of the redirection field 226 and the hand-off signaling. Similarly, binding table entry for HoA2 230 contains HoA2 231, HA2 232, MN X CoA 233, MIP signaling state 234, process field 235, redirection field 236, and MIP forwarding state 237. The result is that the binding table facilitates the redirection of a packet flow towards the HoA, to be redirected to a MN located at a registered CoA.

Figure 3:
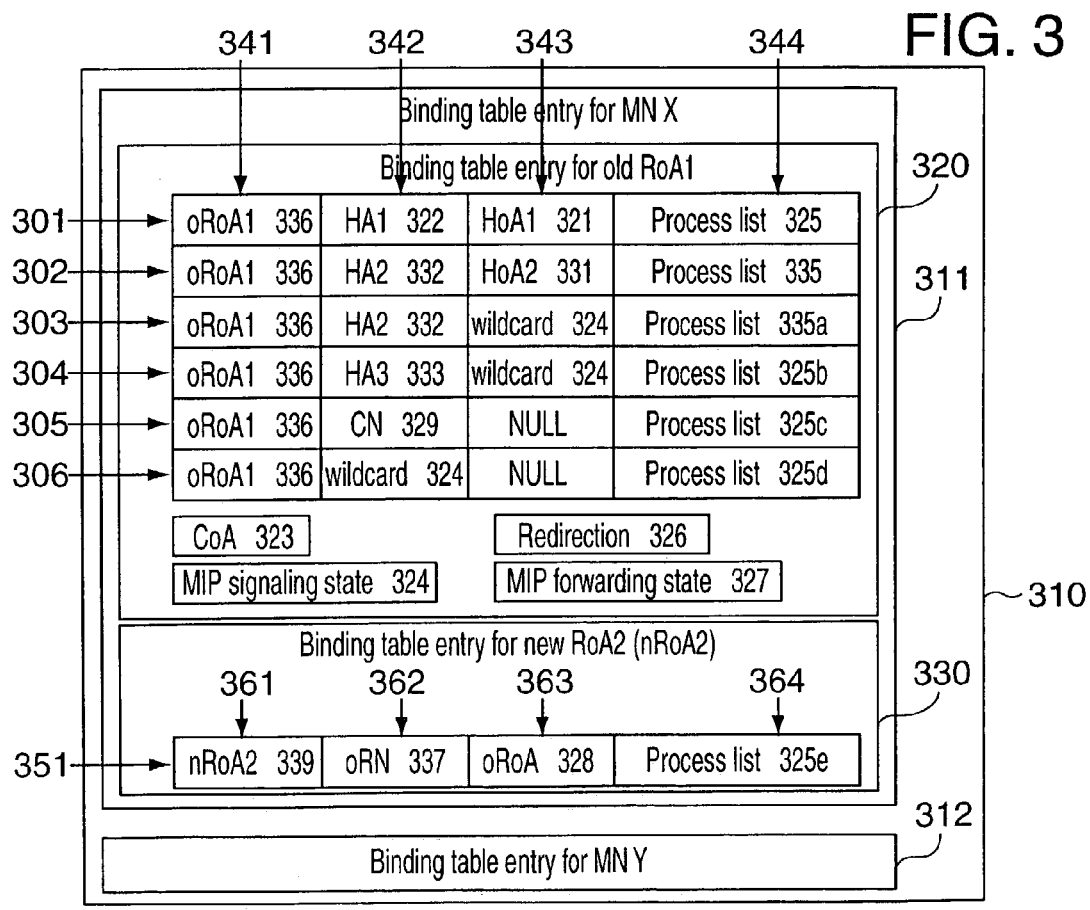
FIG. 3 illustrates a exemplary binding table that is located in an RN in accordance with the present invention.

FIG. 3 illustrates a binding table 310 in accordance with the invention, is located in the RN. Binding table 310 includes entries for a multitude of end nodes such as a binding table entry for Mobile Node X 311 and a binding table entry for Mobile Node Y 312. Binding table entry for MN X 311 includes a binding table entry for old Regional Address 1 (oRoA1) 320 and a binding table entry for new Regional Address 2 (nRoA2) 330, said old and new RoAs being employed before, during, and after a hand-off to transfer local and remote access packet flows from the oRoA1 to the nRoA2. Binding table entry for oRoA1 320 in the old RN (oRN) includes an exemplary table of six rows (first row 301, second row 302, third row 303, fourth row 304, fifth row 305, and sixth row 306) and four columns (first column 341, second column 342, third column 343, and fourth column 344), representing example entries. The features of the binding table are described for forward packets towards a MN X 311 that has been assigned the oRoA 1 as an interface address. The first column 341 entries include the oRoA1 address 336 which would be received as the destination address of a local or remote access packet. The second column 342 entries indicate a potential source address of those packets. The third column 343 entries indicates the potential destination address of an encapsulated base packet flow arriving from a Home Agent as a result of the binding table in FIG. 2, when the CoA 233 is the oRoA1. The fourth column 344 entries includes a list of processes to be performed on the received packet flow if the arriving packet addresses match the entries in the first three columns 341, 342, 343 in that row of the table. Following the action of a specific process list, the packet flow is forwarded to the CoA 323 using the redirection process of 326, according to the forwarding state 327 and the signaling state 324, in accordance with the invention.

First row 301 of the binding table indicates that if the destination address of a received packet is the oRoA1 336, and the source address of that packet is HA1 322, and the encapsulated packet has a destination address equal to the HoA1 321 (i.e., is remote access traffic from HA1) then the process list 325 is to be performed.

Second, third, fourth, fifth, and sixth rows (302, 303, 304, 305, and 306) will similarly have destination address oRoA1 336 in the first column 341.

Second row 302 shows that if the source address is instead HA2 332 and the encapsulated address is HoA2 331, then this is a different remote access flow and process list 335 should be performed, said list 335 being different from list 325 to enable different policy processes to be applied to different remote access flows, including without loss of generality dropping all packets, firewalling, packet header quality of service remarking, accounting metering, Network Address Translation (NAT), security processing and NAT traversal for MIP messages.

Third row 303 shows another remote access flow from HA2 332 but the wildcard 324 entry in the third column 343 shows that the process list 335a should be applied to any other remote access flows from HA2 332 with any other HoA that is not equal to HoA2 331. This would typically be provided by a MN profile which would not know about dynamic HoA addresses to be allocated to a MN in the future.

Fourth row 304 provides an entry for source address HA3 333 that again has a wildcard 324 HoA field (third column 343) and hence any remote access flow from HA3 uses process list 325b.

In the fifth row 305, we have a local access flow because the source address is that of a Correspondence Node (CN) 329 and not a HA, and in that case there is no encapsulated HoA packet so the third column 343 entry is NULL. This local access packet undergoes process list 325c.

In the sixth row 306, we have an entry for local access traffic from any undefined CN because the source address in second column 342 is the wildcard 324. Again, as in the case of the fifth row 305, the third column 343 entry for the sixth row 306 is NULL. These local access flows undergo process list 325d. Note that remote access flows should not have a wildcard source address to prevent packet flows 160g and 160h in FIG. 1 when the binding table 310 is in an RN and an AN respectively. In some cases, remote access flows should only be accepted from registered HAs and RNs.

An example is shown from the Binding table entry for nRoA2 330 as a first row 351 with first column 361, second column 362, third column 363, and fourth column 364. Columns 361, 362, 363, 364 in binding table entry for nRoA2 330 are defined similarly to the description above for the table in entry 320. The first row 351 exemplary entry corresponds to when a change in region is ongoing, wherein the oRN forwards packets for the oRoA1, towards the nRN using the nRoA2 as CoA 323. Therefore, row 351 shows that the packet destination address (first column 361 entry) at the nRN is the nRoA2 339, the packet is received from the oRN (source address (second column 362 entry=oRN 337)) and the inner address (third column 363 entry) is the oRoA1 328 (This causes those packets to undergo process list 325e (fourth column 364 entry) which can be specifically designed to control inter-region traffic due to any HoA address from remote access flows being deeper in the packet and potentially requiring further analysis. Finally, it is clear that when route optimization is employed by a CN to a MN, to bypass a HA in a remote access flow, the binding table state and redirection processing in the RN needs to be updated for the CN rather than the HA address (and the CN style not the HA style) for the binding table entry in the second column 362 to ensure the correct process list is employed, and the redirection correctly accomplished. Note: oRoA1 328 may be distinct from oRoA1 336 as the addresses may apply at different times or to different nodes.

Figure 14:
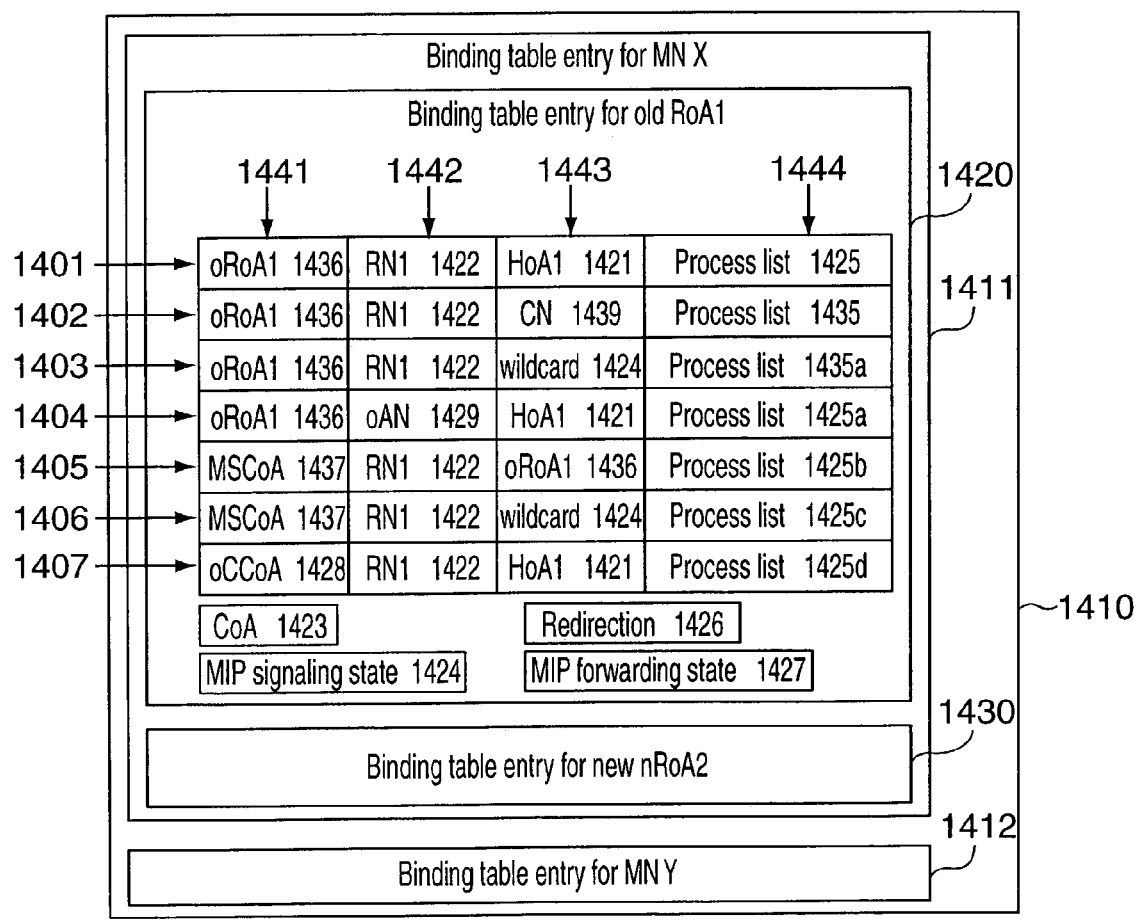
FIG. 14 illustrates an exemplary binding table that is located in an AN in accordance with the present invention.

FIG. 14 shows an exemplary Access Node binding table 1410, in accordance with the invention, that is used to support the forwarding of the invention and between an AN and a MN X, and between an oAN and a nAN in support of transient forwarding during a hand-off of the MN X. The binding table 1410 includes a binding table entry 1411 for MN X and a binding table entry 1412 for MN Y. The entry 1411 for MN X is broken down into a table 1420 for an old roaming address (oRoA1) from an old RN, and a table 1430 for a new roaming address (nRoA2) from a new RN. The table 1420 includes MIP signaling state 1424, Redirection state 1426, MIP forwarding state 1427 and CoA 1423. These are used to redirect traffic between ANs during a hand-off and are specific to the type of CoA and forwarding at the nAN and oAN, as described later in FIGS. 6, 8 and 9. Binding table 1420 also includes and illustrates example entries for MN X that is receiving local and remote access traffic at an AN towards its oRoA1 and HoA1. The table includes four columns 1441, 1442, 1443, 1444, and seven rows 1401, 1402, 1403, 1404, 1405, 1406, 1407. First column 1441 includes the contents of the destination address of the received packet, after the removal of any SHCoA, used to find the appropriate table entry for that packet. Second column 1442 includes the source address of that packet which must be either a registered RN or AN. Third column 1443 includes an additional and optional address in the received packet (ie in an inner header) that is used as an additional discriminator between table rows. Fourth column 1444 includes the process list to be undertaken for a packet matching the entries in the same row for columns 1441, 1442, 1443. The process list will typically include, in conjunction with the MIP forwarding state, the processing required to deliver the packet to the MN X over the access link, and state containing the MN X link-layer address.

First row 1401 example illustrates that the SHCoA was removed to reveal the oRoA1 1436 as the destination address, received from RN1 1422 and with an inner packet destinated to the HoA1 1421 of the MN X. In such a case then process list 1425 is executed before the packet is forwarded. In the second row 1402 example, a packet is again received from RN1 1422 to oRoA1 1436 but third column 1443 contains a CN address 1439 which indicates that local access traffic from this node should use process list 1435. In the third Row 1403 example, a packet is again received from RN1 1422 to oRoA1 1436 but third column 1443 contains a wildcard 1424 which indicates that all other packets (other than with HoA1 1421) should use process list 1435a. Fourth row 1404 example shows an entry for transient forwarding in a nAN where a remote access packet is received from the oAN to the oRoA1 (after removal of the SHCoA) with an inner address equal to the HoA1 1421 and so employs process list 1425a. Fifth row 1405 example shows a packet received with a MSCoA 1437 from the RN1 1422 with a check to ensure that the oRoA1 1436 is correct resulting in process list 1425b being executed. In the sixth row 1406 example, a packet received with a MSCoA 1437 from RN1 1422 but this time without a check on the inner packet so a wildcard 1424 is used in column 1443 and process list 1425c is executed. In the seventh row 1407 example, during a hand-off at the oAN, a packet is received to the oCCoA 1428 of MN X from the RN1 1422 with an inner address HoA1 1421. This will be forwarded using the CoA 1423 and redirection state 1426, but will first employ process list 1425d.

Figure 4:
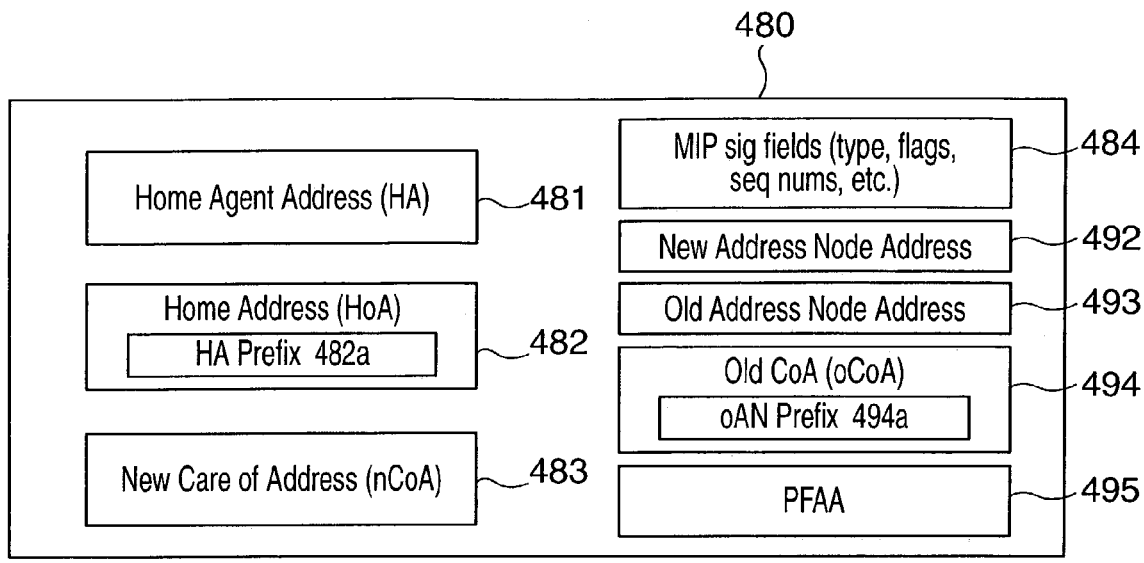
FIG. 4 illustrates detailed contents of a prior art message to a Home Agent.

FIG. 4 illustrates detailed contents of a prior art message to a Home Agent 480. Detailed contents 480 contains Home Agent Address (HA) 481, Home Address (HoA) 482 including HA prefix 482a that is allocated to and routable through the home agent using address 481. The message further includes a new Care of Address (nCoA) 483 of the end node to which the end node will be mapped following the completion of a hand-off. Prior art message contents 480 also includes MIP signaling fields 484 that contains additional signaling information such as flags, sequence numbers, etc. In addition, message contents 480 includes a new access node address 492, corresponding to the new access node to which the end node will establish an association as part of a hand-off operation once the hand-off is completed, an old access node address 493, corresponding to the access node to which the end node has an existing association with. Message contents 480 contains an old CoA (oCoA) 494 including old Access Node (oAN) prefix 494a, corresponding to the care of address used, when the end node is attached to the old access node or has a current association with during a hand-off operation. Contents 480 also includes a Previous Foreign Agent Authenticator (PFAA) portion 495. The PFAA is an authenticator that is pre-calculated by the MN to secure a message between the new Access Node (nAN) and the old Access Node (oAN) during a hand-off. The PFAA is carried to the nAN, along with other message contents, by the Previous Foreign Agent Notification Extension (PFANE).

Figure 5:
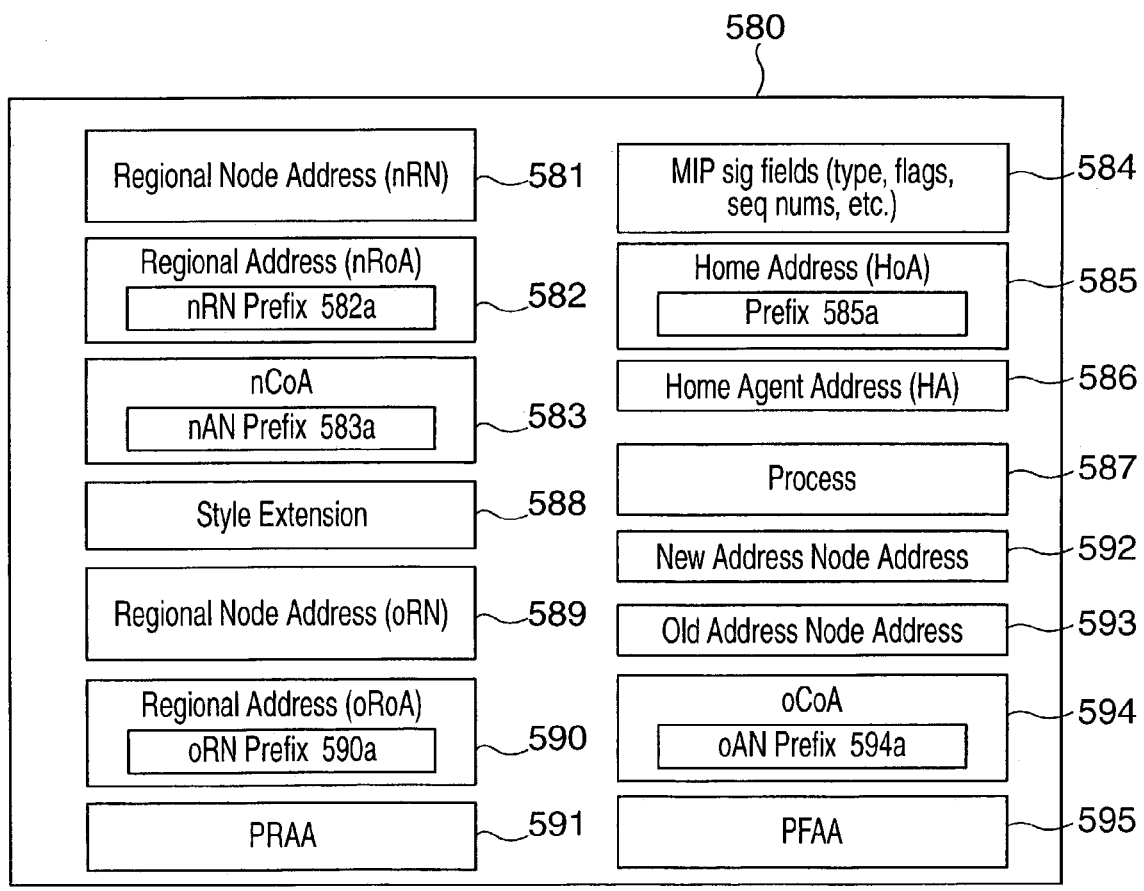
FIG. 5 illustrates detailed contents of an exemplary Aggregated Message in accordance with the present invention.

FIG. 5 shows detailed contents 580 of an exemplary aggregated message in accordance with the present invention, which is used for messages 180a through 180f (See FIGS. 1 and 7), with some subset of the contents 580 used in each message. Aggregated message contents 580 includes a new Regional Node Address (nRN) 581, a new Regional Address (nRoA) 582 including nRN prefix 582a, a new Care of Address (nCoA) 583 including nAN Prefix 583a, MIP signaling fields (flags, seq. nums, etc.) 584, a Home Address (HoA) 585 including prefix 585a, a Home Agent Address (HA) 586, a process portion 587, a style extension portion 588, an old Regional Address (oRN) 589, an old Regional Address (oRoA) 590 including oRN prefix 590a, a Previous Regional Agent Authenticator (PRAA) portion 591, a new Access Node Address 592, a Old Access Node Address 593, an old Care of Address (oCoA) 594 including an old Access (oAN) prefix 594a, and a PFAA portion 595. The invention includes the novel process of a Previous Regional Agent Authenticator (PRAA), which is a precalculated authenticator by the MN, using the existing MN-oRN shared security association, and that is used to secure hand-off messages sent by the nAN and the nRN to the oRN. The PRAA is carried to the nAN, along with other message contents, by the Previous Regional Agent Notification Extension (PRANE).

Figure 6:
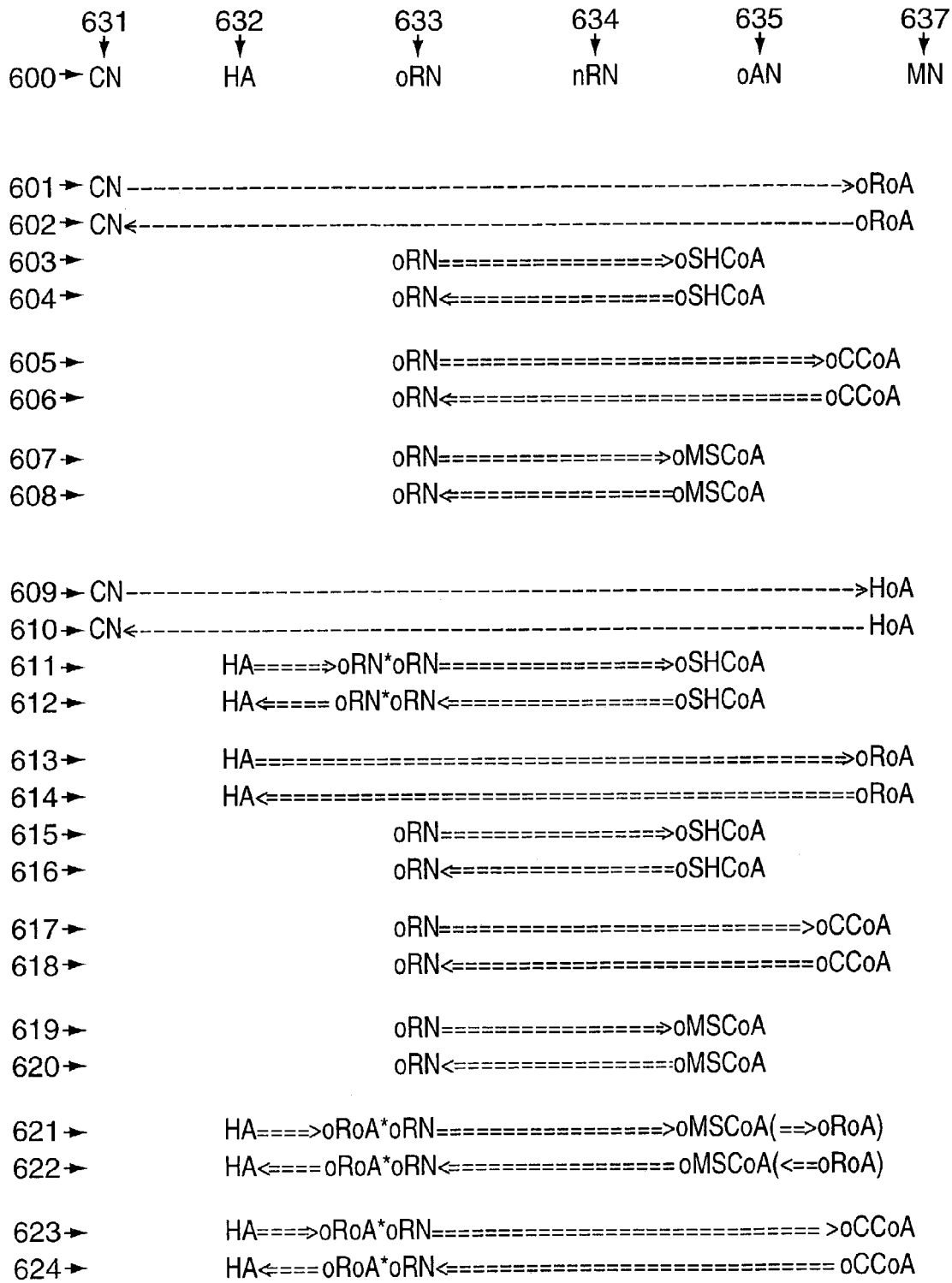
FIG. 6 illustrates various exemplary packet redirection processing and Forward and Reverse Remote Access Regional Forwarding in accordance with the present invention.

FIG. 6 shows various packet redirection processing that occurs in nodes, similar to End Node 110, Access Node 120, Regional Roaming Node 130, and Home Agent Node 150 of FIG. 1, in accordance with the invention. In FIG. 6, each of the first through sixth columns indicate processing, e.g. packet processing, or other operations, e.g. the addressing components of a redirected packet between the nodes, occurring at the node indicated in the first row 600 of FIG. 6. For example, the first column indicates processing or other operations occurring at Correspondence Node (CN) 631 while the sixth column indicates processing or other operation occurring at exemplary MN 637. Similarly, the nodes of FIG. 6 are referenced as follows: Correspondence Node CN 631. Home Agent HA 632, old Regional Roaming Node (oRN) 633, new Regional Roaming Node (nRN) 634, old Access Node (oAN) 635, and Mobile Node (MN) 637. FIG. 6 is further divided into 24 additional rows, with each row number (e.g. second row 601) describing a type of packet processing and the location of the packet processing is indicated by the columns associated with the information in each row.

FIG. 6 uses a dashed single row with an arrow to show the forwarding and processing of an unredirected base packet flow between the nodes at which the dashed row terminates. The label at the start of the arrow is the source address and the label at the end of the arrow is the destination address. FIG. 6 uses a dashed double row to show the forwarding applied to redirect such a base packet flow. The processing associated with said redirection can be an address switching function at a node represented by the '*' symbol which causes the destination address of a packet flow to be amended, or the addition of a redirection header wherein an additional destination address is added to the packet flow, using for example a routing header, said additional address and associated forwarding shown in another row associated with a base flow or a previous redirection of a base flow. An encapsulation process can finally be used to add a new source and destination address to create a tunnel. Encapsulation processes are, without loss of generality, used for the examples associated with the invention described in FIGS. 6, 8, 9, but redirection headers may also be used in accordance with the invention.

The term 'old' is used to refer to an existing node and/or existing address having an association with a MN or a current association with a MN during a hand-off operation, whilst the term 'new' is used to refer to a new node and/or new address to which a MN will establish an association as part of a hand-off operation. Once the hand-off is completed, including release of the previous old node and/or address, then the new node and/or address becomes an old node and/or address.

FIG. 6 shows in second row 601 the required forwarding for forward local access traffic from a Correspondent Node 631 with address CN to a Mobile Node 637 with an old Roaming Address (oRoA), where that oRoA includes a prefix from the oRN 633 rather than from the oAN 635. Packets with a destination address equal to the RoA are routed to the oRN 633. Packets with a destination address equal to the MN CoA, said CoA including a prefix allocated to the oAN 635, with be forwarded to the node assigned that CoA which is either the oAN 635 or the MN 637. Third row 602 shows the reverse local access traffic.

Fourth row 603 shows the required processing in the oRN 633 and the oAN 635 for the base flow in row 601 to reach the MN 637 when the MN 637 uses an old shared care of address (oSHCoA). This uses an encapsulation of the base flow at the oRN 633 with a source address equal to the oRN address and a destination address equal to the oSHCoA at the oAN 635, said oAN 635 removing said encapsulation and forwarding the base flow to the MN 637. The oRN 633 therefore keeps a binding entry between the oRoA and the oSHCoA of the MN 637, and the oAN 635 keeps a binding between the oRoA and the MN 637 so it can decapsulate and forward the base packet flow, said binding rules ensuring that the tunnel source address is that of the oRN 633. Fifth row 604 shows the reverse tunneled processing to be applied to the reverse base flow in row 602, which uses the same binding table entries and the opposite processing steps as described for row 603.

Sixth row 605 shows a second alternative for the row 601 flow which is to encapsulate that flow with the oRN 633 source address, and a destination address equal to the old Colocated Care of Address (oCCoA) of the MN 637, the encapsulation being then removed by the MN 637. The oRN 633 binding maps the oRoA to the oCCoA, and the oAN 635 has a routing entry for the oCCoA pointing to the MN 637. The MN 637 then has a binding table that ensures the packet source address is the oRN (633). Seventh row 606 shows the reverse tunneled processing to be applied to the reverse base flow in row 602, which uses the same binding table entries and the opposite processing steps as described for row 605.

Eighth row 607 shows a third alternative which is to use an old mobile specific CoA (MSCoA also known as a Proxy Colocated Care of Address) in the oRN (633) binding, and a decapsulation process in the oAN (635) which uses a binding table containing a binding entry between the oMSCoA and the MN (637). The processing associated with that binding entry also checks that the source address of the tunnel is that of the oRN (633), and optionally checks that the destination address of the base flow is the oRoA assigned to that MN (637). Ninth row 608 shows the reverse tunneled processing to be applied to the reverse base flow in row 602, which uses the same binding table entries and the opposite processing steps as described for row 607.

The forwarding and processing rules associated with rows 601 through 608 ensures that packets are only forwarded between CN 631 and MN 637 if the oRoA in the base flow matches the CoA of the encapsulated flows, to prevent packets being fraudulently injected by bypassing the redirection tunnel in either direction.

When the MN 637 is in its home region within its home domain, then the oRN 633 can be considered to be acting as the local Home Agent of the MN 637, such that the oRoA is the Home Address of the MN 637, then the processing of rows 603,604,605 and 606 may be supported by standard Mobile IP, but the processing of rows 607 and 608, associated with the use of an oMSCoA, in accordance with the present invention, is novel. Further note that the use of an oMSCoA, in accordance with the present invention, adds an additional benefit, in that the oAN 635 can avoid keeping state for, and then inspecting, the oRoA, and can instead rely on the check at the oRN 633 between the oRoA and the oMSCoA.

The mechanisms of rows 601 to 608 also provide capabilities for forwarding a base flow containing remote access packets in either direction between a CN address and a MN Home Address (HoA), when the MN 637 is not in its home region (but may be in a home or visited domain). This is possible if that remote access base flow is encapsulated into the oRoA of the MN 637, to look like the local access base flow of rows 601 and 602. The HoA is assigned to the MN 637 as an application address and includes a prefix allocated to the HA 632. Therefore packets with a destination address equal to the HoA are routed to the HA 632, whilst packets with a destination address equal to the RoA are routed to the oRN 633.

In tenth row 609, packets addressed to the HoA in the forward base flow from the CN 631 are routed to the HA 632 in the home region. The HA 632 has a binding table entry that maps the HoA of the MN 637 to the CoA that is equal to the oRoA, so that the HA 632 can encapsulate the remote access base flow with a source address equal to the HA address and a destination address equal to the oRoA. This is possible in standard Mobile IP by the MN 637 and HA 632 treating the oRoA as a CCoA for the MN 637. However, standard Mobile IP does not support the use of a regional node, because the CCoA=oRoA enables the remote access flow to only reach the oRN 633. Eleventh row 610 shows the reverse remote access base flow to row 609.

Mobile IP provides an extension scheme for a regional mobility agent called a Gateway Foreign Agent. Twelfth row 611 shows the GFA processing within the oRN 633 and the processing of the HA 632. The HA 632 receives the base flow of row 609 addressed to the HoA and encapsulates the base flow using the HA 632 as a source address and the oRN 633 address as the destination address. The GFA in the oRN 633 then decapsulates the base flow, compares the HoA destination address to a binding table that has a CoA equal to the oSHCoA (shown in row 611) or oCCoA (not shown in row 611). The GFA then encapsulates the base flow into the CoA of the MN 637 and forwards the encapsulated packets to the MN 637 via the oAN 635. The oAN 635 includes a binding table and an oFA when the CoA is a SHCoA and may include said binding table and oFA when the CoA is the oCCoA. Thirteenth row 612 shows the situation for reverse remote access traffic to the situation of row 611 in conjunction with the base flow in row 610.

The problem with the GFA model is that the oAN 635 receives packets that lack the HA 632 as a source address and therefore the oAN 635 cannot distinguish between packet flows originating from two different HAs that are re-using the same private address space. In addition, the oFA in the oAN 635 must keep state about each oHoA of a MN 637 so that all arriving packets can be inspected and correctly forwarded between the oAN 635 and the MN 637, state which must be transferred between ANs during hand-off. Finally, if the oRN 633 crashes then the switching state in the oRN 633 will be lost and the CoA=oRN entry in the HA 632 becomes invalid, the GFA in the oRN 633 effectively relying on a distributed and stateful switching approach which is known to be fragile.

According to the invention, as shown in FIGS. 1 to 8, the HA 632 can use the oRoA as a CCoA and therefore produce a forward flow shown in fourteenth row 613 (with base flow in row 609) and a reverse flow in fifteenth row 614 (with base flow in row 610), that has an encapsulation with a destination/source address equal to the oRoA and a source/destination address equal to the HA. The binding tables of rows 603 through 608 (repeated in sixteenth row 615 through twenty-first row 620) will then forward these packets using the previously described rules for local access traffic. This creates Nested MIP remote access forwarding with the inventive aspects being the use of the oMSCoA. Note that three types of reverse tunneling are supported in Nested MIP. Remote access layer reverse tunneling is between the oRoA and the HA 632 as shown in row 614, whilst combined local access and remote reverse tunneling is additionally between the oAN 635 or MN 637 and the oRN 633. Local access only reverse tunneling (row 616 or row 620 in conjunction with row 610) may not be supported because the oAN 635 has binding state for the oRoA and not for the HoA, and so cannot identify the correct local access tunnel for the flow from the MN 637. Local access only forwarding is possible with row 618 in conjunction with row 610 because the MN 637 undertakes the encapsulation of the HoA for the oAN 635. The optional tunneling of twenty-second row 621 and twenty-third row 622 is available to make Nested and Concatenated packet flows look the same to the host, such that the HoA traffic is received in a tunnel to the oRoA. Suitable concatenated aware host processing can however avoid the need for this.

An inventive alternative type of processing, in accordance with the invention, is shown in rows 621 and 622, known as Concatenated MIP, for forwarding the base flow in rows 609 and 610, between the HA 632 and the MN 637, which addresses the described limitations of the GFA forwarding in rows 611 and 612. In row 621, the HA 632 has a binding table the same as for Nested MIP in row 613/614, with the oRoA of the MN 637 as a CCoA. The HA 632 forwards to the oRN 633 using the resulting encapsulation. In Nested MIP rows 615, 617, 619 the oRN 633 adds an additional encapsulation, but this creates additional packet overhead. Therefore, in row 621, the oRN 633 instead switches the source and destination address of the encapsulation to create a packet with a source address equal to the oRN 633 address and a destination address equal to the oMSCoA of the MN 637. This is forwarded to the oAN 635 which decapsulates the packet flow to reveal the base flow of row 609, and uses the oMSCoA to identify the associated MN 637 so it can forward the remote access base flow in row 609 to the MN 637. An equivalent flow is shown in twenty-fourth row 623 where the CoA in the oRN 633 binding is the oCCoA of the MN 637 from the prefix of the oAN 635, and the oAN 635 simply forwards the packets to the MN 637 which undertakes the decapsulation. The reverse flows are shown in rows 622 and 624 corresponding to forward flows in rows 621 and 623, respectively, for reverse tunneling the HoA flow in row 610 through the AN, RN and HA. Concatenated traffic can not be reverse tunneled to just one of the RN and HA other than by using a Nested MIP reverse path (row 610+row 614 or row 610+row 620) which is available due to Nested routing being in place for local access traffic, and the fact that the HA has a reverse binding for the oRoA.

Note that in either case of Nested or Concatenated MIP, in accordance with the present invention, it is not necessary for either the oRN or the oAN to store the HoA address in their tables to achieve successful forwarding of the base flow because the HA is trusted to correctly encapsulate into the oRoA, and the oRN is trusted to correctly encapsulate into the SHCoA, oMSCoA or oCCoA of the MN. Also note that because the HoA is not needed, in accordance with the invention, then that state, for potentially a multitude of HoAs for one or more MNs, does not need to be stored or handed-off between oANs and oRNs, and there is no ambiguity caused by HoAs from overlapping private address space as is the case in GFA. Also note that if the oRN fails then the state for the oRoA in the HA is still valid, if a standby oRN shares that oRoA address and routing makes that oRN the preferred destination on failure of the original oRN. The standby oRN then by acquiring the MN CoA at the oAN may reinstate forwarding which is signaling localized to the visited region (non-distributed, semi-stateful forwarding).

When comparing Nested MIP with Concatenated MIP it can be seen that Concatenated forwarding has one less layer of encapsulation than Nested MIP but requires more complicated processing in the oAN and the oRN. Both Nested and Concatenated MIP require a local access regional registration between the MN and the oRN, potentially via the oFA in the oAN, to register the binding between the oRoA and the MN CoA at the oAN, that being either a CCoA, a SHCoA or a MSCoA. This can be achieved using a standard MIP messaging, that is extended, in accordance with the invention, to support the allocation and carriage of a MSCoA from the prefix of the oAN. Note that the first such regional registration, when arriving in the region of the oRN, enables the MN to acquire the oRoA from the oRN. In addition, both Nested and Concatenated MIP require a remote access registration between the MN and each HA, that is employed by the MN for remote access to each HoA. This registration may again be routed via the oFA in the oAN using standard MIP signaling, to create the binding entry in the HA between the HoA and the MN CCoA=oRoA. Note however, that whilst standard MIP signaling can be used for either local access regional registration, or the remote access registration, a mobility agent that receives both types of messages needs to be able to distinguish between each type of message so that the appropriate changes, in accordance with the invention, can be made to binding tables in the appropriate nodes.

In an inventive step therefore, a MIP flag or Style extension is added to at least one of the local access and remote access messages which is processed by receiving nodes, to achieve this distinction.

Whilst neither Nested MIP nor Concatenated MIP requires it, there may be specific policy reasons for installing HoA specific state for remote access flows in the oRN and the oAN as next described according to the methods of the invention. The regional forwarding for the Nested MIP remote access layer employs the forwarding from the Nested MIP local access layer; however, whilst Concatenated MIP also employs the Nested MIP local access layer forwarding, it offers an alternative forwarding model for remote access traffic. An operator may well wish to policy remote access traffic differently than local access traffic in both Nested and Concatenated remote access, and undertake processes that are specific to one of a plurality of HoAs being used by a MN.

Therefore, in an inventive step, the binding table in the oAN required when the MN is using either a MSCoA or a SHCoA, is extended to store a HoA address of the MN, and in some cases the associated HA address, as well as a process instruction indicating a process to be applied to the remote access base flow that uses that HoA as a source and destination address. The inclusion of the HoA in the oAN enables the oAN to inspect packets to/from the MN to identify said base flow and to then apply the associated process, in accordance with the invention.

One such process is to remark the diff-serv codepoint, of the packets associated with the base flow or the encapsulated base flow, to provide differential forwarding between the oAN and the oRN, and/or between the oAN and the MN.

Another process is to pass the base flow through firewall state associated with the HoA of the MN (configured via MN profile retrieved from the AAA system, or dynamically installed by the MN using for example MIP signaling) so that only specific packet types in the base flow are forwarded by the oAN.

Another such process is to modify a HoA specific accounting parameter when packets for that specific HoA are received, forwarded or dropped.

Another such process, in the specific case of Nested MIP, is to check that the source address is equal to the registered HA of the MN for the HoA in the destination address, to prevent packets using the HoA as a destination address, being injected by a fraudulent HA in the tunnel to the oRN.

In still another process, the MN profile state can identify specific HA and HoA addresses that the MN is, and is not, allowed to register with the oRoA as a CCoA, as an INCLUDE/EXCLUDE list. MIP signaling messages are then compared to this state to control MN invocation of remote access flows in the foreign region.

In a further inventive step, the binding table in the oRN is extended to store a HoA address, and in some cases the home agent address of the MN, as well as a process instruction indicating a process to be applied to the remote access base flow using that HoA as a source and destination address. The inclusion of the HoA in the oRN may first cause the oRN to inspect packets to/from the HA to identify said base flow and to then apply the associated process, in accordance with the invention.

One such process is to remark the diff-serv codepoint of the packets associated with the base flow or the encapsulated base flow to provide differential forwarding between the oRN and the HA, and/or between the oRN and the oAN and MN.

Another process is to pass the base flow through firewall state associated with the HoA of the MN (configured via MN profile retrieved from the AAA system, or dynamically installed by the MN using for example MIP signaling) so that only specific packet types in the base flow are forwarded by the oRN.

Another such process is to modify a HoA specific accounting parameter when packets for that specific HoA are received, forwarded or dropped.

Another such process, in the specific case of Nested MIP, is to check that the source/destination address is equal to the registered HA of the MN for the HoA in the destination/source address, to prevent packets being injected by a fraudulent HA or oAN into the oRN.

In still another process, the MN profile state can identify specific HA and HoA addresses that the MN is, and is not, allowed to register with the oRoA as a CCoA, as an INCLUDE/EXCLUDE list. MIP signaling messages may then compared to this state in the oRN to control MN consumption of remote access in the foreign region.

This enables the base MIP forwarding to be extended to use targeted HoA/HA state only for those base flows that require that state. Note also that the oAN can rely on the oRN to compare the base flow (against HA/HoA include/exclude list and the associated firewall state), to police and optionally drop a subset of the packets in that base flow, and to account for the packets that are received, forwarded or dropped in that flow, and hence avoid storing that state and undertaking that processing in the oAN at the edge of the network.

Meanwhile the local access base flow does not have to be analysed by the HA/HoA specific processes because the RoA is an address of a base flow, rather than an address of an encapsulated flow. This can be detected by the oRN and oAN to cause the local access packets to be passed through a completely different classification process if necessary and avoid the step of analyzing for identified HA/HoA addresses. All remote access flows however, even those that do not have HA/HoA state installed, do need to be analysed by the HA/HoA classifier state.

In a further inventive step, to facilitate the introduction of HA/HoA specific state into the binding tables, such state can be delivered in the MN profile from the AAA server. Alternatively, the regional registration signaling, that includes the oRN, RoA, and the MN CoA, can be extended to include HA/HoA state for a MN which can be installed in any node that the signaling traverses (oRN and oAN), and the state can specifically indicate which nodes the state is intended for. In a hybrid solution, the MN profile indicates the state for the HA but the dynamically allocated HoA is learnt from the regional registration message.

In one embodiment of the invention, the remote access registration message to the HA, which already includes the address of the HA, the HoA and the oRoA, can be routed to the oRN and even to the oAN, and used to selectively populate the HA/HoA state into the binding tables associated with that RoA to police remote access traffic for the MN using that RoA. In support of this, the policing state for the HoA and/or HA can be optionally delivered to the oRN and the oAN in a AAA message from the AAA server, and only optional or dynamic parameters signaled by the MN. Any such MN profile state then needs to be transferred to the nAN and nRN on hand-off to provide continuity of service and service control.

Figure 7:
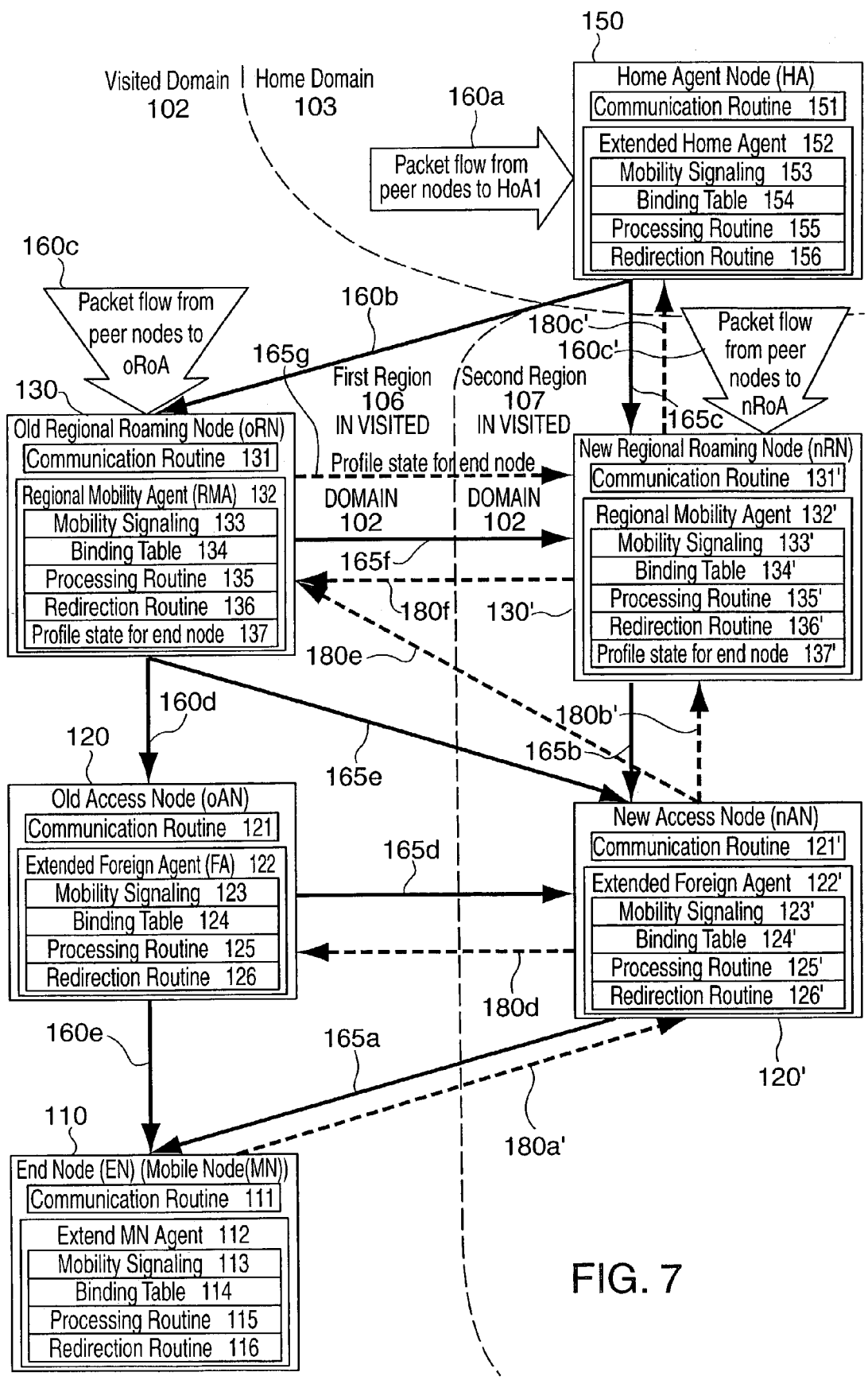
FIG. 7 illustrates an exemplary communications system including elements of the communication system of FIG. 1, the addition of a second region in the visited domain including a second or new RN (nRN), a second or new AN (nAN), additional exemplary packet flow, and additional signaling in accordance with the invention.

FIG. 7 illustrates an exemplary communications system including elements of the communication system of FIG. 1, the addition of a second region 107 in visited in the visited domain 102 including a second or new RN (nRN) 130', a second or new AN (nAN) 120'. FIG. 7. also includes additional exemplary packet flows 160a', 160b', 160c',165a, 165b, 165c, 165d, 165e, 165f and additional exemplary signaling including 180a', 180b', 180c', 180d, 180e, 180f, and 165g in accordance with the invention. FIG. 7 may be used to explain various signaling, hand-off messages, packet flows, operations, and context transfer in accordance with the present invention. Messages 180a', 180b', 180c', 180d, 180e and 180f are sent between nodes 110, 120',120, 130',130, 150' as mobility messages. Message 180a' becomes message 180b' either as a result of IP forwarding, in which case message 180a' contents are the same as that of message 180b', or as a result of mobility message processing at the oAN 120', in which case the contents of messages 180a' and 180b' are different. Similarly, for all messages passing through other nodes 120', 130'.

Figure 8:
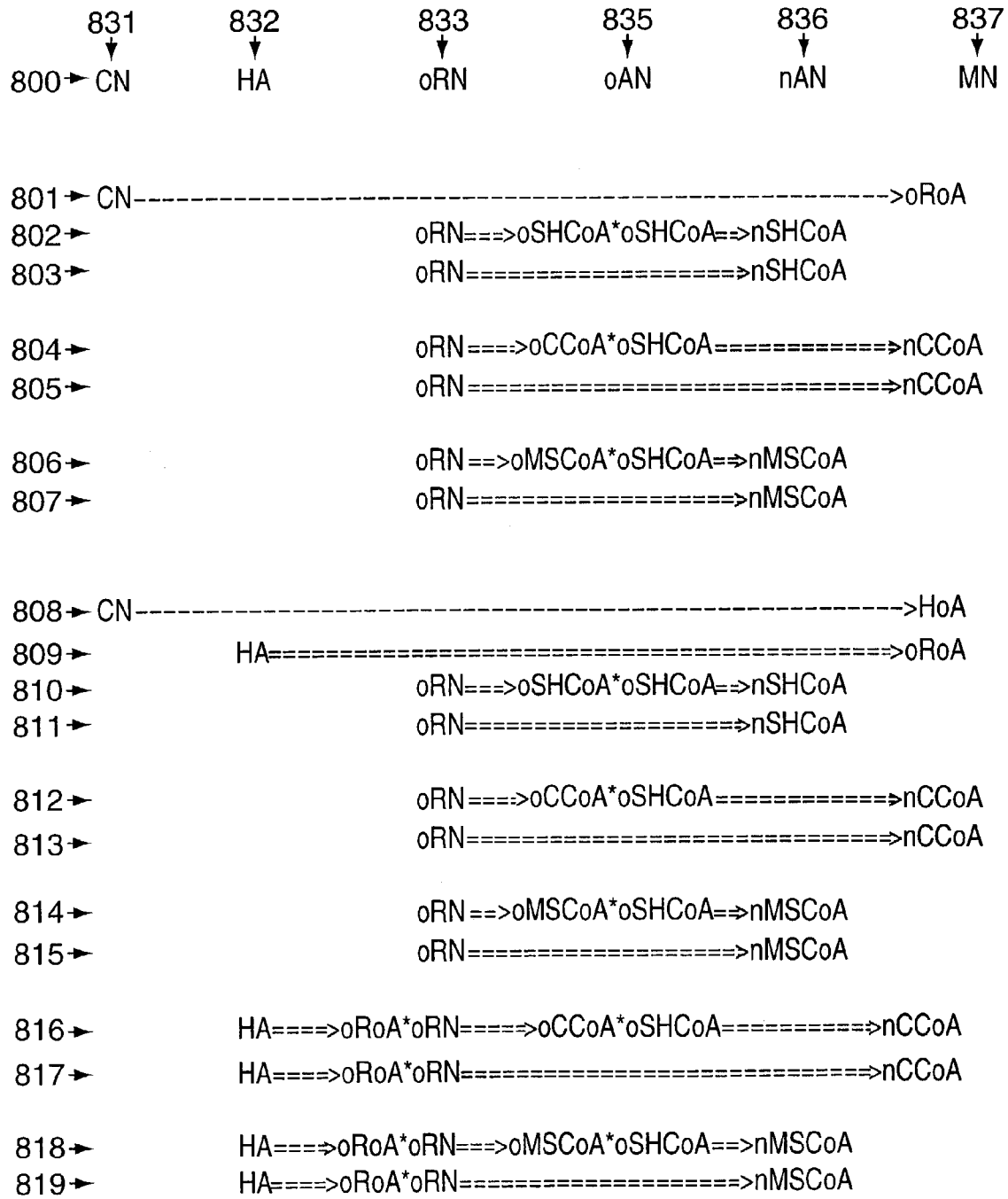
FIG. 8 illustrates Transient forwarding in accordance with the present invention.

Referring to FIG. 7, when a MN 110 changes oAN 120 to move to a new AN (nAN) 120', then various existing context transfer mechanisms can be used to transfer profile state to the nAN 120'. In addition, a BU 180d message can be sent from the nAN 120' to the oAN 120 to install temporary or transient forwarding between the oAN 120 and the nAN 120' as flow 165d for packets in-flight from the oRN 130 to the oAN 120 within packet flow 160d. The details of this transient forwarding flow is shown in FIG. 8.

In the existing BU the 'HA field' contains the oAN address, the HoA field contains the oCoA, and the CoA field contains the nCoA, said Coasts being either a SHCoA or a CCoA.

In an inventive step, the BU 'HoA' field can also include either a oRoA or a oMSCoA and the CoA field can include a nMSCoA, said address types and required processing in the oAN 120 being identified in said BU by a hand-off Style. This facilitates the inventive Nested and Concatenated, as well as the existing GFA type, forwarding for in-flight packets between ANs. Note that said BU may also adjusts the binding table in the nAN 121', in accordance with the invention, commensurate with the hand-off Style to enable the forwarded packets to be sent to the MN 110.

When a MN 110 changes region, such as between region 106 and region 7, then the MN 110 will acquire a new RN (nRN) 130' and a new RoA (nRoA) from that nRN 130'. A change in region is typically indicated by the receipt of a region indicator, from either the oAN, nAN, oRN or nRN, such as the IP address of the default nRN at the nAN to be used by the end node at that nAN, said nRN default address being different from the oRN default address. The region indicator would typically be carried in a router advertisement or a link-layer message from an AN. In a preferred embodiment, the region indicator can instead be the Network Access Identifier (NAI) of the nRN or nAN, which is usually structured as userpart@domainpart, but is instead structured to include a regionnamepart. An example for the access node identifier, otherwise known as the FA-NAI, from which the default region of the AN can be determined, would be ANname@regionname.domainname or ANname@regionname.

The FA-NAI is supported in legacy FAs and MNs and is already used to support movement detection. The FA-NAI may be used instead of the IP address based identifier, so that MNs seeking regional services can be supported along with legacy MNs that do not. This is achieved by structuring the username and domain parts of the NAI as 'ANname<specialchar>@regionname@domainname'. The '%' character is an obvious suggestion to enable legacy nodes to skip over the unexpected additional @ character. A legacy MN will correctly interpret the domain part to detect inter-operator hand-off and will not see the substructure in the username part, but will correctly distinguish between ANs and hence support inter-AN hand-off. Only a regional aware MN can see the sub-structure and will use this to determine when inter-AN and inter-RMA hand-offs are required.

The nRN 130' and nRoA can be aquired using messages 180a' from MN 110 to nAN 120' and 180b' from nAN 120' to nRN 130' with associated response messages, said nRoA being then registered into the HA 150 using message 180c' from nRN 130' to HA 150 to facilitate the forwarding of remote access traffic to/from the MN 110. The nRoA however, cannot be registered until the regional registration has installed forwarding between the nRN 130' and the MN 110 for the nRoA. Therefore there is a period during which packets for the MN 110 will need to continue to use the oRoA and so in-flight inter-region forwarding is required. Forwarding between ANs is however expensive as it is between the edges of the network.

Therefore, in a further inventive step, in-flight forwarding is installed between the oRN 130 and the nAN 120', using a regional registration to the oRN 130 (180a' plus 180e from nAN 120' to oRN 130) which looks simply as if the nAN 130' is still in the region of the oRN 130, as well as being in the region of the nRN 130'. This option is therefore covered by FIG. 1 signaling. Alternatively, the MN 110 can add an extension into the regional registration to the nRN 130' (180a' plus 180b') which causes a BU 180e to be sent by the nAN 120' to the nRN 130'. The message from the MN 110 includes a pre-calculated authenticator for the nAN 120' based on the security association between the MN 110 and the oRN 130, as well as the hand-off Style to install the correct type of forwarding for the MN 110 in the oRN 130 and the nAN 120'. Alternatively, or in addition, the MN 110 can include an extension in the regional registration message to the nRN 130' that triggers a BU 180f to be sent from the nRN 130' to the oRN 130 to install forwarding between the oRN 130 and the nRN 130'. This extension includes a pre-computed authenticator for the BU to be sent by the nRN 130', using the existing security association between the MN 110 and the oRN 130.

The hand-off Style is also responsible for indicating whether the oRoA/nRoA needs to be a private or public IPv4 address. If it is a private address, then an exemplary RN can include a Network Address Translator to map between the private RoA and a public address pool at the RN, resulting in address efficiencies especially for MNs employing only local access service. MIP NAT traversal can then be used with such private RoAs to still be able to send remote access MIP messages through the NAT and to install remote access forwarding.

In a further inventive step, a regional registration can be sent to the oRN 130 via the nAN 120' and nRN 130' to install the inter-region forwarding using messages 180a', 180b' and a message 180f from nRN 130' to oRN 130.

Alternatively, a remote access registration can be sent via the same elements to the oRN 130 when the oRN 130 and oRoA is to be transitioned into a remote access HA and HoA. This is especially useful when the MN 110 leaves its home region, and the oRN 130 includes both a home mobility agent and a regional mobility agent for the oRoA.

In another embodiment, a combined regional and remote access registration message can be sent to either the oRN 130 (if it is to be a HA after inter-region hand-ott) using messages 180a', 180b', 180f, or one of the current HAs of the MN 10 using messages 180a', 180b' and 180c'. Either message flow installs both the local access state in the nAN 120' and nRN 130', retrieves the nRoA from the nRN 130', installs that nRoA into the destination of that message (oRN 130 or the HA 150) and triggers at least one of the inter-AR, oRN-nAR and oRN-nRN transient forwarding as identified by the extensions in that combined message and the hand-off Style. This combined message reduces the hand-off delay and improves the efficiency especially in the case of a MN employing a single HA/HoA pair. The multiple transient forwarding messages provide increased protection against signaling packet loss associated with any one of those messages, and enables the gradual redirection of the in-flight packets to the new forwarding elements and state to reduce application disruption and policy interference.

During the hand-off between ANs and between RNs, flows 165f (from oRN 130 to nRN 130'), 165e (from oRN 130 to nAN 120') and 165d (from oAN 120 to nAN 120') may provide transient forwarding to the nRN 130' and the nAN 121', for the oRoA flows. After hand-off, the HA 150 can deliver remote access traffic to the nRoA as flow 165c (from HA 150 to nRN 130'), which is forwarded by the nRN 130' binding table into flow 165b (from nRN 130' to nAN 120'), along with local access traffic to the nRoA as flow 160c' (packet flow from peer nodes to nRoA). Flow 165b is then forwarded by the binding or routing table in nAN 120' to the MN 110 as flow 165a.

Figure 9:
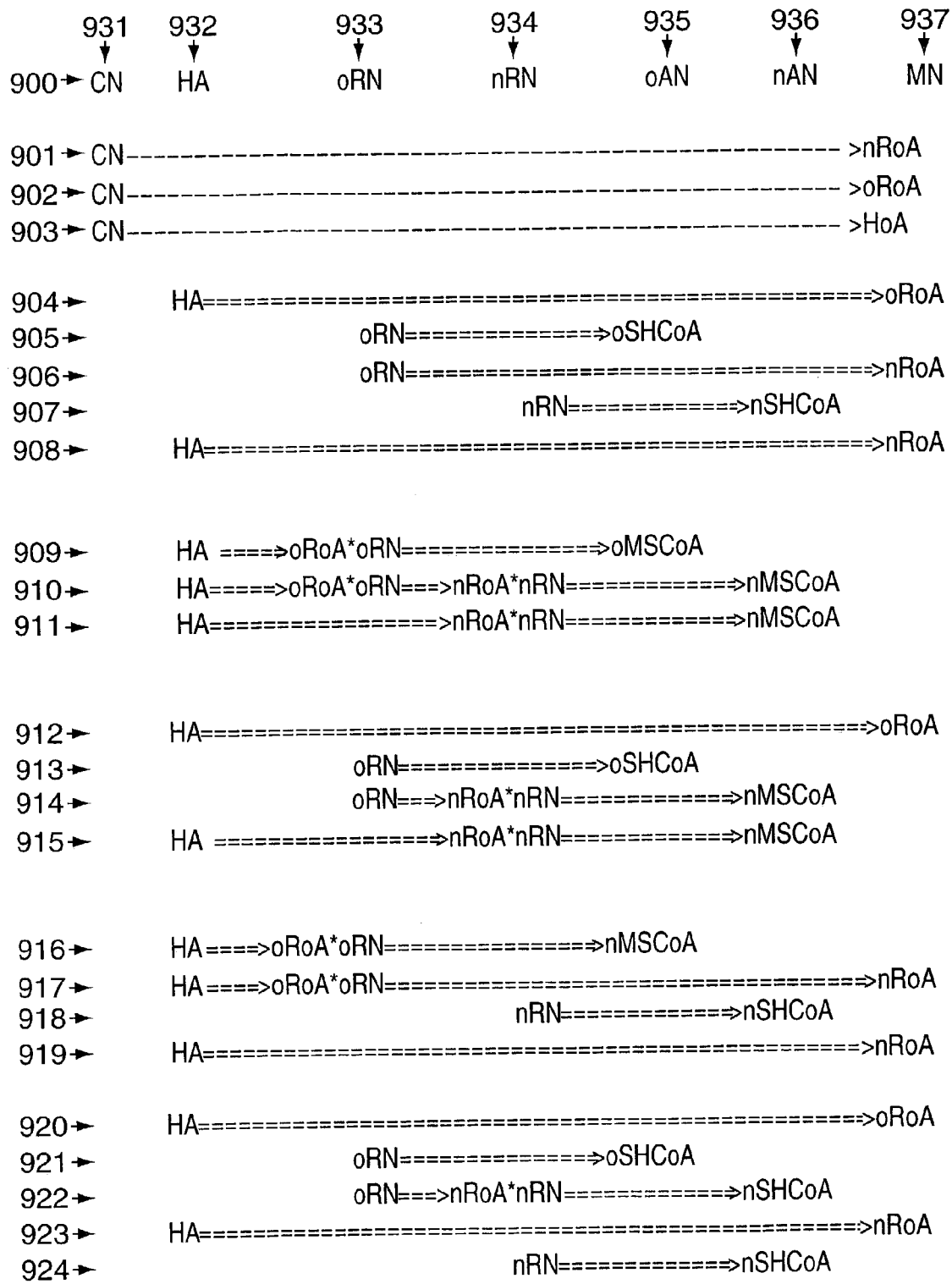
FIG. 9 illustrates Inter-RMA Forwarding for Local and Remote Access in accordance with the present invention.

The packet processing and resulting forwarding in the oRN, nRN and nAN is again identified by the Style extension, various options, in accordance with the invention, are shown in FIGS. 8 and 9. FIGS. 8 and 9 discuss the forward direction of base flows towards the MN, but as was described for FIG. 6, the same bindings can be used for reverse packet flows, in accordance with the invention.

In FIG. 8, each of the first through sixth columns indicate processing, e.g. packet processing, or other operations, e.g. the addressing components of a redirected packet between the nodes, occurring at the node indicated in the first row 800 of FIG. 8. The nodes of FIG. 8 may be similar to the nodes: EN 110, HA 150, oRN 130, oAN 120, nAN 120', and nRN 130' of FIG. 7. First row 800 includes CN 831, HA 832, oRN 833, oAN 835, nAN 836, and MN 837. First column relates to CN 831, second column relates to HA 832, third column relates to oRN 833, fourth column relates to oAN 835, fifth column relates to nAN 836, and sixth column relates to MN 837. Each of the nineteen subsequent rows in FIG. 8, second row 801 through twentieth row 819, identifies processing and forwarding at and between nodes. Second row 801 shows the local access base flow between the CN 831 and the oRoA. When a MN 837 is handing off between oAN 835 and the nAN 836, then the MN 837 needs to update the CoA in the binding in the oRN 833, and install a new binding entry in the nAN 836, to direct packets in the base flow to the MN 837 via the nAN 836. In addition, in-flight packets from the oRN 833 towards the oAN 835 need to be forwarded onto the nAN 836 to avoid packet loss during that hand-off. Further, when the MN 837 is in hand-off between RNs, then the forwarding from the oRN 833 to the nAN 836 also represents transient forwarding, where the lifetime of the bindings in the oAN 835 and the oRN 833 are relatively short.

The base packet flows to the oRoA are forwarded by the oRN 833 to the CoA from the prefix of the oAN 835, which is the oSHCoA. The oAN 835 on receipt of hand-off message 180d from hand-off message 180a', will update the CoA of the binding in the oAN 835 for the oRoA, replacing the oSHCoA with the nSHCoA, creating flow 165d. Meanwhile, message 180a' installs a new binding into the nAN 836 directing base flow packets for the oRoA to the MN 837 creating flow 165a. Also, message 180e is sent to the oRN 833, which also includes the nSHCoA as the new CoA of the oRoA, to replace the oSHCoA in the oRN 833 binding. This can create packet flow 165e.

Flow 165d is shown in third row 802, and is a prior art forwarding mechanism that uses the switching technique employed by existing GFAs and existing FAs. The oAN 835 will decapsulate the base flow from the oSHCoA, find the binding table entry using the oRoA in the base flow destination address, and then re-encapsulate to the nSHCoA. These packets will then be redirected to the nAN 836.

Flow 165c is shown in row 803, where packets for the oRoA are received at the oRN 833, where the binding entry for the oRoA is found and the CoA determined. In fourth row 803, the CoA is now the nSHCoA rather than the oSHCoA and so the packets are forwarded to the nAN 836 where the new binding created for the oRoA will be found, containing the link-layer address of the MN 837, and the packet forwarded to the MN 837.

The transient forwarding, when the Coasts at the oAN 835 and nAN 836 is a CCoA, is described in fifth row 804 and sixth row 805. In row 804, the oAN 835 has a binding between the oCCoA to the nCCoA and does not need to inspect the oRoA address, and the binding in the nAN 836 is simply the routing entry for the nCCoA of the MN 837. In row 805, the oRN 833 finds the binding table entry for the oRoA and encapsulates packets to the nCCoA instead of to the oCCoA.

The equivalent forwarding, when the Coasts in the oAN 835 and nAN 836 are the novel MSCoA of the invention, is shown in seventh row 806 and eighth row 807. In row 806, the oAN 835 has a binding between the oMSCoA and the nMSCoA and does not need to inspect the oRoA. In row 807, the nAN 836 has a binding between the nMSCoA and the link-layer address of the MN 837, and once again the RoA does not need to be inspected.

Various combinations of oCoA at the oAN 835 and nCoA at the nAN 836 are also possible, when the type of the oCoA is not equal to that of the nCoA, the required binding table state and associated processing may be determined from the previous examples.

Ninth row 808 shows the transient forwarding for the base remote access flow between the CN 831 and the HoA. This flow can be redirected to the MN 837 using the local access binding table state in the case of Nested MIP when in tenth row 809 the packet to the HoA will be encapsulated towards the oRoA address. The flow of row 808 is then the same as that of row 801 to the oRN 833, oAN 835 and nAN 836, and so rows 802, 803, 804, 805, 806, and 807 are repeated in eleventh through sixteenth rows 810, 811, 812, 813, 814, and 815, respectively.

Concatenated remote access forwarding can alternatively be used as shown in seventeenth through twentieth rows 816, 817, 818 and 819, as these reduce the number of encapsulations and hence the packet overhead for transient forwarding. In rows 816 and 817, the MN 837 has an oCCoA and a nCCoA at the oAN 835 and nAN 836. In row 816, the base flow in row 808 is received at the HA 832 where the binding table for the HoA has the oRoA as the CoA which the HA 832 uses to encapsulate the base flow in row 808. Note that the binding table in the HA 832 is the same for both Nested and Concatenated forwarding. The encapsulated packet is then received at the oRN 833 where the binding table entry for the oRoA causes the switching of the base flow into an encapsulation with the oCCoA as the destination address which reaches the oAN 835. The oAN 835 then undertakes the same processing of rows 814 and 812 to forward the packets received on the oCCoA to the nCCoA. When the oRN 833 binding has been updated with the nCCoA, then in row 817, the concatenated packets from the oRN 833 will be forwarded directly to the nCCoA as is the case with rows 805 and 813. In rows 818 and 819, the concatenated forwarding for the case of the MN 837 having an oMSCoA at the oAN835 and a nMSCoA and the nAN836 is also shown, the forwarding using the same processing in the oRN833, oAN835, nAN836 as in rows 816, 817, 814 and 815. The case of the oCoA and the nCoA being of different types is also possible although there are restrictions on the use of SHCoAs with concatenated forwarding.

Therefore local access, Nested remote access and concatenated remote access transient forwarding, as described, uses the same processing in the oRN833, oAN835 and nAN836 for a given combination of oCoA and nCoA.

A novel inter-region hand-off is further described with reference to FIG. 7, triggered by a variety of signaling combinations. The messages 180a', 180b', 180d, 180e result in packet flows 160b (remote access from 160a) and local access 160c, being redirected from 160d and then 160e, into 160d and then 165d, due to inter-AN transient forwarding. Next, as part of oRN130-nAN130' forwarding, flows 160b (from 160a) and 160c are redirected into flow 165e. Now, an inter-RN redirection is triggered using the message 180f from the nRN 130' to the oRN 130, that redirects flows 160b (from 160a) and 160c into flow 165f. This additional layer of redirection is useful because the oRN 130 and nRN 130' are likely to be highly connected over high-speed links and will have extensive, security and policy configuration for controlling packet flows. This inter-RN forwarding is useful whilst flow 160a is directed into flow 160b and whilst flow 160c is still needed by the MN. Message 180c' to the HA 150 will cause flow 160a to instead be forwarded into flow 165c by replacing the oRoA with the nRoA, as the CCoA in the HA150 message 160 binding for the HoA of the MN 110. In addition, the message 180f can trigger the novel transfer of the MN profile state 165g from the oRN 130 to the nRN 130' and associated context state, this state including the RN-HA150 security association, and the MN-RN security association, that can be re-used at the nRN 130', said context transfer being secured using any type of nRN-nRN security association. Note that any combination of messages 180d, 180e and 180f can be employed to trigger the associated inter-region forwarding steps, the optimal combination being dependent on a number of actors such as the size of nodes and links, the various relative path lengths, the duration of the inter-region hand-off. Note in addition, that the signaling examples are based on a reactive hand-off model generated at the nAN 120' back to the oAN 120. There exists a proactive form of hand-off from the oAN 120 to the nAN 120' which can generate the flows 165d, 165e and 165f using signaling messages, 180d, 180e and 180f, but in the opposite direction to that shown in FIG. 7. Without loss of generality, the forwarding signaling can be triggered by various combinations for proactive and reactive hand-off signaling. However, in the case of reactive signaling, a number of options exist for triggering the inter-region forwarding.

Messages 180a', 180b' can be used to acquire the nRN and nRoA state via the nAN 120', and to install inter-AN and oRN130-nAN120' transient forwarding. The mapping between the various parameters in the exemplary message of FIG. 5, and the MIP message fields for this flow, for each message, is summarized in FIG. 10.

Messages 180a', 180b' and 180f can be part of a local access regional registration message to the oRN130 which also configures the nRN 130' and nRoA, and associated binding state in the oRN130, nRN130' and nAN120'. The mapping between the various parameters in the exemplary message of FIG. 5, and the MIP message fields for this flow, for each message, is summarized in FIG. 11.

Alternatively, messages 180a', 180b' and either 180f or 180c' can be part of a remote access registration message to the oRN130, which converts the oRN130 to a HA150 and the oRoA into a HoA for the MN 110, or to the HA150, so that flows 160c can be maintained in the new region. The message replaces the oRoA with the nRoA in the HA150 binding table for the HoA. This message flow also configures binding state in the oRN130, nRN 130' and nAN120' for a nRN130' and a nRoA previously obtained from a regional registration message to the nRN130'. The mapping between the various parameters in the exemplary message of FIG. 5, and the MIP message fields for this flow, for each message, is summarized in FIGS. 12 and 13, where the nRN 130' and nRoA is known for message 180a' as it follows a local registration to the oRN130 as in FIG. 11.

Alternatively, messages 180a', 180b' and 180f, or messages 180a', 180b' and 180c', ca be part of a combined remote access and local access registration message to the oRN130 which, for 180f converts the oRN130 to a HA150 and the oRoA into a HoA for the MN 110, and then the HA50 replaces the oRoA with the nRoA so that flows 160c/165f can be forwarded to the new region. This message flow also obtains the nRN130' and nRoA, and creates the associated binding state in the oRN130, nRN130' and nAN20' for the transient inter-RN forwarding. The mapping between the various parameters in the exemplary message of FIG. 5, and the MIP message fields for this flow, for each message, is summarized in FIGS. 12 and 13, where the nRN130' and nRoA are not known for message 180a', and are set to '0' as it does not follow a local registration to the oRN130 as in FIG. 11.

All of these options can install the three types of transient forwarding, and if the MN110 does so with a local access registration then it does not need to do it with the resulting remote access registration, which can instead be used to cancel that forwarding after some binding lifetime. A combined LA/RA message can also install the transient forwarding, in accordance with the invention.

In FIG. 9, first row 900 shows CN931, HA932, oRN933, nRN934, oAN935, nAN 936 and MN937 in first, second, third, fourth, fifth, and sixth column, respectively. The nodes of FIG. 9 may be similar to the nodes: EN 110, HA 150, oRN 130, oAN 120, nAN 120', nRN 130' of FIG. 7. FIG. 9 also shows the resulting inter-RN forwarding for the case of message 180c' to the HA932 and message 180f to the oRN933, without discussing the details of any inter-region forwarding between oAN935 and nAN936, and between nRN934 and nAN936, which was previously discussed in FIG. 8. FIG. 9 shows the use of SHCoAs and MSCoAs; both Nested and Concatenated forwarding can use CCoAs, in accordance with the invention.

Second row 901 shows the base flow from the CN931 to the nRoA which will be created by the MN937 when it is assigned the nRoA from the nRN934 and starts to use that address for communications. Meanwhile, existing communication sessions continue to use the base flow from the CN931 to the oRoA as shown in third row 902. In addition, the MN937 can have a multitude of home addresses (HoAs) assigned from one or more HAs 932, with one such HoA base flow shown in fourth row 903.

Fifth row 904 and seventh row 906 show the forwarding before the inter-RN hand-off when the oRN933 and nRN934 both support Nested MIP forwarding. Fifth row 904 shows the encapsulation of the HoA base flow into the oRoA flow, to join the existing local access oRoA flow in row 902. In sixth row 905, the forwarding in the oRN933 is then to encapsulate the resulting oRoA flow into a tunnel from the oRN933 to the oSHCoA at the oAN935. Inter-RN forwarding is then shown in row 906 and eighth row 907, wherein in row 906 the binding in the oRN933 is modified to point to the nRoA, and in row 907 a binding is added in the nRN934 to encapsulate traffic towards the nSHCoA of the MN937 at the nAN936. In ninth row 908, the HA932 binding is modified to point to the nRoA instead of the oRoA (from row 904), which is forwarded by the binding in the nRN934 in row 907, because all that has changed is the source address of the encapsulation which is now the HA932 instead of the nRN934. This means that the processing state created for the inter-RN forwarding in the nRN934 and the nAN936 is also used after the hand-off which is efficient in terms of state changes. This illustrates an exemplary execution of a Nested to Nested regional hand-off using Nested inter-RN forwarding, according to the methods of the invention.

Tenth row 909 shows the forwarding before the inter-RN hand-off when the oRN933 and the nRN934 both support Concatenated MIP. Row 909 shows that before the hand-off, the HA932 is encapsulating and forwarding the remote access base flow to the oRoA which is switched in the oRN933 towards the oMSCoA. Local access traffic addressed to the oRoA arrives at the oRN933 and is encapsulated and forwarded by the oRN933 into the tunnel to the oMSCoA. During the inter-RN hand-off, the binding in the oRN933 is modified to point to the nRoA as shown in eleventh row 910, and the nRN934 has a new binding installed that points to the nMSCoA. Local access traffic addressed to the oRoA may be injected into this forwarding at the nRN933 whilst local access traffic to the nRoA may be injected at the nRN934. In twelfth row 911, the inter-RN hand-off is complete because the HA932 is now forwarding to the nRoA, local access traffic is now using the nRoA, and no local access traffic is being supported to the oRoA. The nRN934 then forwards traffic to the nRoA towards the nMSCoA. Note again that the state created in the nRN934 and nAN936 for the inter-RN forwarding is re-used for the forwarding after the hand-off. This illustrates an exemplary execution of a Concatenated to Concatenated regional hand-off using Concatenated inter-RN forwarding, according to the methods of the invention.

To support hand-offs between RNs that support different forwarding models, thirteenth, fourteenth, fifteenth, and sixteenth rows 912,913,914 and 915, respectively, show an example of a hybrid inter-RN hand-off. In row 912, before the hand-off, the base flow to the HoA is encapsulated in the HA932 towards the oRoA, and both local and remote access flows are forwarded in row 913 to the oSHCoA. During inter-RN forwarding in row 914, the oRN933 binding is modified to forward to the nRoA which in the nRN934 is forwarded to the nMSCoA at the nAN936. Local access traffic to the nRoA is then forwarded at the nRN934 whilst local access traffic to the oRoA is forwarded at the oRN933. Next, in row 915, the HA932 is updated to forward to the nRoA whilst no local access traffic exists to the oRoA. Therefore, the state in the nRN933 is dropped and the nRN934 and nAN936 may reuse the state that was created for the inter-RN concatenated forwarding. This illustrates an exemplary execution of a Nested to Concatenated regional hand-off using Concatenated inter-RN forwarding, according to the methods of the invention.

To further support hand-offs between RNs that support different forwarding models, seventeenth, eighteenth, nineteenth, and twentieth rows 916,917,918 and 919, respectively, show a different example of hybrid inter-RN hand-off. In row 916, and before the hand-off, the base flow to the HoA is encapsulated in the HA932 towards the oRoA which is switched towards the oMSCoA in the oRN933. Local access traffic to the oRoA is forwarded by the same state in the oRN933 and oAN935. During inter-RN forwarding in row 917, the oRN933 binding is modified to forward to the nRoA which in the nRN934 is forwarded to the nSHCoA at the nAN936 by an additional encapsulation shown in row 918. At this point, local access traffic to the nRoA will be forwarded by the nRN934 direct to the nSHCoA. After the hand-off, in row 919, the HA932 is updated to forward to the nRoA whilst no local access traffic exists to the oRoA. Therefore, the concatenated state in the oRN933 is dropped, and the additional encapsulation state between the nRN934 and the nSHCoA at the nAN936 that was created for the inter-RN concatenated forwarding may be reused. This illustrates an exemplary execution of a Concatenated to Nested regional hand-off using Nested inter-RN forwarding, according to the methods of the invention.

It should be noted that other versions of hybrid inter-RN forwarding exists that use the forwarding model of the oRN933 rather than that of the nRN934 (Nested to Concat using Nested, and Concat to Nested using Concat) which are discussed in the provisional which is incorporated by reference above, and may be used in accordance with the invention. The hand-off Style field informs signaled nodes of the hand-off/forwarding style which affects the MIP forwarding and CoA contents.

In addition, hybrid forms of forwarding exist that use an alternative inter-RN forwarding that uses a different model than either of the two RNs during normal forwarding, and may be used in accordance with the invention. One of these offers significant benefits and is shown in twenty-first through twenty-fifth rows 920 to 924 for the case of Nested to Nested hand-off using Concatenated inter-RN forwarding. The benefit is that this avoids an extra encapsulation whilst still preserving Nested forwarding in steady state between each RN and its AN. In row 920, the HA932 is forwarding to the oRoA and in row 921 the oRN933 is encapsulating the row 920 flow to the oSHCoA. In row 922, the inter-RN forwarding is achieved by the oRN933 encapsulation of row 921 being redirected to the nRoA. This encapsulation is then switched in the nRN934 towards the nSHCoA. This forwards row 920 via the encapsulation of row 922. Note that a nMSCoA (the normal CoA type for concatenated) is not used because Nested uses a nSHCoA, and because the encapsulation of row 920 ensures the destination of the flow after decapsulation from flow 922 is unambiguous at the nAN936. In row 923, the HA932 is updated with the nRoA as the destination address to replace row 920, and the nRoA is forwarded to the nSHCoA by row 924, enabling the state in the oRN933 to be dropped.

FIG. 10 shows the content of the various message fields for a Local Access (LA) MIP Registration to the nRoA at a nRN. The table of FIG. 10 includes a first row 1011, each element of first row 1011 describing the contents of the information in each column below. The table includes a first column 1001 with the potential message field content description as shown in FIG. 5, for populating the constituent messages (180*a*-180*f*). Second column 1002 includes Message 180*a* fields. Third column 1003 includes Message 180*b* fields. Fourth column 1004 includes Message 180*c* fields. Fifth column 1005 includes Message 180*d* fields. Sixth column 1006 includes Message 180*e* fields. Seventh column 1007 includes Message 180*f* fields. FIGS. 10-12 descriptions of messages are also applicable to messages with (e.g., 180*a*/180*a*', 180*b*/180*b*', 180*c*/180*c*').

Regarding Message 180*a* of the Second Column 1002:

In second row 1013, message 180*a* is a local access message as indicated by placing the LA indicator into the type field of the MIP message. The type field is an existing MIP sig field 584 and a new value would be used to distinguish LA, RA and LARA signaling.

In third row 1014, the HA 150 address is not required.

In fourth row 1015, the HoA at the HA 150 is not required.

In fifth row 1016, the address of the nAN is the destination address (DA).

In sixth row 1017, the address of the oAN is included in the PFAN extension (PFANE).

In seventh row 1018, the oCoA at that oAN is also included in the PFANE.

In eighth row 1019 the nRN address is placed into the HA field of the message, or set to if not known.

In ninth row 1020 the oRN address is included in the PRAN extension (PRANE).

In tenth row 1021, the oRoA is also included in the PRANE and may also be the 180a source address when the nRoA is unknown.

In eleventh row 1022, the nCoA at the nAN is included in the CoA field of the message.

In twelvth row 1023, the nRoA is placed in the HoA field of the message and is also the source address, HoA field is set to 0 when the nRoA is unknown.

In thirteenth row 1024, the Previous Foreign Agent Authenticator (PFAA) is included in the PFANE to secure message 180d.

In fourteenth row 1025, the Previous Regional Agent Authenticator (PRAA) is included in the PRANE to secure messages 180e/180f.

Subsequent messages will now be described in terms of the message fields and the associated field content from first column 1001.

In third column 1003, message 180b has: a source address (SA) equal to the nAN address (in row 1016), in the destination address is equal to that of the nRN (in row 1019) that was assigned at the nAN, in the oRN and oRoA are in the PRANE (in rows 1020,1021), the CoA of the message is the nCoA (in row 1022) and the HoA is either the nRoA or 0 (in row 1023), and the PRAA is in the PRANE (in row 1025).

In fourth column 1004, message 180c is not used.

In fifth column 1005, message 180d is a BU with a source address equal to the nAN address (in row 1016), a destination address equal to the oAN which is also used in the HA field (in row 1017). The HoA field contains the oCoA (in row 1018) and the PFAA is used as the MN-oAN authenticator to secure the message (in row 1024).

In sixth column 1006, message 180e is a BU with a source address equal to the nAN (in row 1016) and a destination address and HA field equal to the oRN (in row 1020). The oRoA is in the HoA field (in row 1021) and the nCoA is in the CoA field (in row 1022). The PRAA is in the MN-oRN authenticator field (in row 1025) to secure the BU.

In seventh column 1007, message 180f is a BU with a source address equal to the nRN (in row 1019) and a destination address and HA field equal to the oRN (in row 1020). The oRoA is in the HoA field (in row 1021) and the nRoA, which was assigned at the nRN, is included in the CoA field (in row 1023). The PRAA is in the MN-oRN authenticator field (in row 1025) to secure the BU.

FIG. 11 shows the message details, which won't be restated here for purposes of brevity, for the Local access MIP messages towards the oRN, via the nRN. The structure of table of FIG. 11 is similar to that of FIG. 10 (previously described). First through fourteenth rows (1111, 1113-1125) of FIG. 11 are similar to rows (1011, 1013-1025) of FIG. 10, respectively; first through seventh columns (1101-1107) of FIG. 11 are similar to columns (1001-1007) of FIG. 10, respectively. The new message field in FIG. 10 is the Hierarchical Foreign Agent extension (HFAext) which carries the nCoA at the nAN, to the nRN (as shown in row 1122 for Message 180a of column 1102 and Message 180b of column 1103).

FIG. 12 shows the message details for the remote access message to the oRN for the oRoA to install inter-RN forwarding and conversion of the oRN and oRoA into a remote access HA/HoA pair for the MN. Note that in this case the remote access message is routed via the optional nodes nAN and nRN, requiring the message to carry information about those nodes. The structure of table of FIG. 12 is similar to that of FIG. 10 (previously described). First through fourteenth rows (1211, 1213-1225) of FIG. 12 are similar to rows (1011, 1013-1025) of FIG. 10; respectively. First through seventh columns (1201-1207) of FIG. 12 are similar to columns (1001-1007) of FIG. 10, respectively. The messages of FIG. 12 can be a pure remote access message following the messaging of FIG. 10 to configure the oRN with the nRoA, in which case the type is RA, or it can be a combined remote and local access message in which case the type is LARA (see row 1213, column 1201), and the message can also configure at least the nRN and even acquire the nRoA at that nRN, as will be described below. One new extensions of FIG. 12 is the Hierarchical Foreign Agent IP extension (HFAIP) shown in row 1219 for message 180a of column 1202. The HFAIP is used to carry the nRN address (if already known) to the nAN to be used as the destination address of message 180b (see column 1203, row 1219), and the source address of message 180f (see column 1207, row 1219). The HFAIP is not used if the nRN is not yet known because the nAN will be able to determine the nRN address itself. The nCoA is sent to the nRN in the HFAext (see row 1222, messages 180b columns 1203) and used as the CoA for messages 180d/180e (see row 1222, columns 1205 and 1206). The nRoA in row 1223 is used as the CoA for messages 180a (column 1202), 180b (column 1203) and 180f (column 1207), and the CoA field is set to zero if it is yet to be allocated by the nRN.

FIG. 13 shows the message field contents for the remote access message to the HA for the HoA, to update the CoA entry from the oRoA to the nRoA, following messaging of FIG. 10. First through fourteenth rows (1311, 1313-1325) of FIG. 13 are similar to rows (1011, 1013-1025) of FIG. 10, respectively; first through seventh columns (1301-1307) of FIG. 13 are similar to columns (1001-1007) of FIG. 10, respectively. This message is of type RA, but a combined message, which also allocates the nRN and nRoA instead of FIG. 10 is possible and has a LARA type (see row 1313, column 1301), which is described below. The source address of message 180a is the HoA (see column 1302, row 1315). In messages 180a/b/c, the HA field has the HA address (see row 1314, columns 1302,1303,1304), the HoA field has the HoA of the MN (see row 1315, columns 1302,1303,1303), and the CoA field has the nRoA, which if not yet assigned can be set to zero (see row 1323, columns 1302,1303), until set in the nRN and carried to the HA in the HFAext in message 180c (see row 1323, column 1304). The HFAIP is used to carry the nRN address to the nAN (see row 1319 column 1302) and the HFAext is used to carry the nCoA at the nAN to the nRN (see row 1322, columns 1302,1303). Messages 180d, 180e and 180f are unchanged.

Whilst the description has focused on forward flows to the MN, the invention is also supportive of reverse traffic, and the Style extension can be used to select between various reverse tunneling combinations at the local and remote access layers for the Nested and Concat forwarding models. In addition, whilst the description has described unicast flows, multicast flows are also supported by the invention. The invention is applicable to MIPv4 or MIPv6 systems, with the main differences being that the MIPv6 uses CCoAs or MSCoAs but cannot use a SHCoA due to the lack of a foreign agent (only an Attendant agent is used).

The provisional applications incorporated by reference into the present application include various exemplary embodiments which are not intended to limit the scope of the present application. Any mandatory language such as must, only, necessary, etc, found in the provisional applications is intended to be interpreted as applying to the exemplary embodiments described in the provisional applications and not to limiting the invention, claims or embodiments described in the present application in any way.

In various embodiments nodes described herein are implemented using one or more modules to perform the steps corresponding to one or more methods of the present invention, for example, signal processing, message generation and/or transmission steps. Thus, in some embodiments various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to machine-readable medium including machine executable instructions for causing a machine, e.g., processor and associated hardware, to perform one or more of the steps of the above-described method(s).

Numerous additional variations on the methods and apparatus of the present invention described above will be apparent to those skilled in the art in view of the above description of the invention. Such variations are to be considered within the scope of the invention. The methods and apparatus of the present invention may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of the present invention.

Numerous variations on the above described inventions will be apparent to those of ordinary skill in the art based on the above description. Such variations are to be considered within the scope of the invention.

What is claimed is:

1. A method operable in a communication network, said method comprising:
   updating a care of address for a regional address of a mobile node in a binding table in response to receiving a message from the mobile node;
   receiving a first redirected packet from a home agent, wherein the first redirected packet comprises a first packet addressed from a first correspondent node to a home address of a mobile node, wherein the home address comprises an address prefix at the home agent;
   receiving a second packet addressed from a second correspondent node to a regional address of the mobile node;
   processing the first redirected packet to generate a second redirected packet;
   processing the second packet to generate a third redirected packet, wherein processing the second packet comprises adding an address of a regional node and a mobile specific care of address into the third redirected packet; and
   concurrently transmitting the second and third redirected packets towards the mobile node via an access node using a destination address that comprises an address prefix at the access node.

2. The method of claim 1, wherein the first redirected packet further comprises a first address that includes an address of a regional node and said processing the first redirected packet comprises adding an address of the regional node and a shared care of address into the second redirected packet.

3. The method of claim 1, wherein the first redirected packet further comprises a first address that includes the regional address and said processing the first redirected packet comprises adding an address of a regional node and at least one of a shared care of address, mobile specific care of address, and collocated care of address into the second redirected packet.

4. The method of claim 1, wherein said processing the first redirected packet comprises removing the first packet from the first redirected packet and adding the first packet into the second redirected packet as a payload.

5. The method of claim 1, wherein said processing the first redirected packet comprises adding the first redirected packet into the second redirected packet as a payload.

6. The method of claim 1, wherein the first redirected packet further comprises an address of the home agent and a first address that includes an address prefix at a regional node, and wherein said processing the first redirected packet comprises comparing the address of said home agent and the first address to a table of binding entries to determine processes to be performed on the first redirected packet.

7. The method of claim 6, wherein said comparing the address of the home agent comprises comparing the home address in the first packet with the binding table entries.

8. A regional node for operating in a communication network, said regional node comprising:
   a processor; and
   circuitry coupled to the processor and configured to:
   update a care of address for a regional address of a mobile node in a binding table in response to receiving a message from the mobile node;
   receive a first redirected packet from a home agent, wherein the first redirected packet comprises a first packet addressed from a first correspondent node to a home address of a mobile node, wherein the home address comprises an address prefix at the home agent;
   receive a second packet addressed from a second correspondent node to a regional address of the mobile node;
   process the first redirected packet to generate a second redirected packet;
   process the second packet to generate a third redirected packet, wherein processing the second packet comprises adding an address of the regional node and a mobile specific care of address into the third redirected packet; and
   concurrently transmit the second and third redirected packets towards the mobile node via an access node using a destination address that comprises an address prefix at the access node.

9. The regional node of claim 8, wherein the first redirected packet further comprises a first address that includes an address of the regional node and said circuitry is configured to add an address of the regional node and a shared care of address into the second redirected packet.

10. The regional node of claim 8, wherein the first redirected packet further comprises a first address that includes the regional address and said circuitry is configured to add an address of the regional node and at least one of a shared care of address, mobile specific care of address, and collocated care of address into the second redirected packet.

11. The regional node of claim 8, wherein said circuitry is configured to remove the first packet from the first redirected packet and adding the first packet into the second redirected packet as a payload.

12. The regional node of claim 8, wherein said circuitry is configured to add the first redirected packet into the second redirected packet as a payload.

13. The regional node of claim 8, wherein the first redirected packet further comprises an address of the home agent and a first address that includes an address prefix at the regional node, and wherein said circuitry is configured to compare the address of the home agent and the first address to a table of binding entries to determine processes to be performed on the first redirected packet.

14. The regional node of claim 13, wherein said circuitry is configured to compare the home address in the first packet with the binding table entries.

15. An apparatus for operating in a communication network, the apparatus comprising:
means for updating a care of address for a regional address of a mobile node in a binding table in response to receiving a message from the mobile node;
means for receiving a first redirected packet from a home agent, wherein the first redirected packet comprises a first packet addressed from a first correspondent node to a home address of a mobile node, wherein the home address comprises an address prefix at the home agent;
means for receiving a second packet addressed from a second correspondent node to a regional address of the mobile node;
means for processing the first redirected packet to generate a second redirected packet;
means for processing the second packet to generate a third redirected packet, wherein the means for processing the second packet comprises means for adding an address of a regional node and a mobile specific care of address into the third redirected packet; and
means for concurrently transmitting the second and third redirected packets towards the mobile node via an access node using a destination address that comprises an address prefix at the access node.

16. The apparatus of claim 15, wherein the first redirected packet further comprises a first address that includes an address of a regional node and the means for processing the first redirected packet comprises means for adding an address of the regional node and a shared care of address into the second redirected packet.

17. The apparatus of claim 15, wherein the first redirected packet further comprises a first address that includes the regional address and the means for processing the first redirected packet comprises means for adding an address of a regional node and at least one of a shared care of address, mobile specific care of address, and collocated care of address into the second redirected packet.

18. The apparatus of claim 15, wherein the means for processing the first redirected packet comprises means for removing the first packet from the first redirected packet and means for adding the first packet into the second redirected packet as a payload.

19. The apparatus of claim 15, wherein the means for processing the first redirected packet comprises means for adding the first redirected packet into the second redirected packet as a payload.

20. The apparatus of claim 15, wherein the first redirected packet further comprises an address of the home agent and a first address that includes an address prefix at a regional node, and wherein the means for processing the first redirected packet comprises means for comparing the address of said home agent and the first address to a table of binding entries to determine processes to be performed on the first redirected packet.

21. The apparatus of claim 20, wherein the means for comparing the address of the home agent comprises means for comparing the home address in the first packet with the binding table entries.

22. A non-transitory computer-readable medium comprising codes executable to:
update a care of address for a regional address of a mobile node in a binding table in response to receiving a message from the mobile node;
receive a first redirected packet from a home agent, wherein the first redirected packet comprises a first packet addressed from a first correspondent node to a home address of a mobile node, wherein the home address comprises an address prefix at the home agent;
receive a second packet addressed from a second correspondent node to a regional address of the mobile node;
process the first redirected packet to generate a second redirected packet;
process the second packet to generate a third redirected packet, wherein processing the second packet comprises adding an address of a regional node and a mobile specific care of address into the third redirected packet; and
concurrently transmit the second and third redirected packets towards the mobile node via an access node using a destination address that comprises an address prefix at the access node.

23. The non-transitory computer-readable medium of claim 22, wherein the first redirected packet further comprises a first address that includes an address of a regional node and processing the first redirected packet comprises adding an address of the regional node and a shared care of address into the second redirected packet.

24. The non-transitory computer-readable medium of claim 22, wherein the first redirected packet further comprises a first address that includes the regional address and processing the first redirected packet comprises adding an address of a regional node and at least one of a shared care of address, mobile specific care of address, and collocated care of address into the second redirected packet.

25. The non-transitory computer-readable medium of claim 22, wherein processing the first redirected packet comprises removing the first packet from the first redirected packet and adding the first packet into the second redirected packet as a payload.

26. The non-transitory computer-readable medium of claim 22, wherein processing the first redirected packet comprises adding the first redirected packet into the second redirected packet as a payload.

27. The non-transitory computer-readable medium of claim 22, wherein the first redirected packet further comprises an address of the home agent and a first address that includes an address prefix at a regional node, and wherein processing the first redirected packet comprises comparing the address of said home agent and the first address to a table of binding entries to determine processes to be performed on the first redirected packet.

28. The non-transitory computer-readable medium of claim 27, wherein comparing the address of the home agent comprises comparing the home address in the first packet with the binding table entries.

* * * * *